(12) United States Patent  
Yin et al.

(10) Patent No.: US 11,683,556 B2
(45) Date of Patent: Jun. 20, 2023

(54) DATA DISPLAY METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Zhi Yin, Shenzhen (CN); Zheng Wang, Shenzhen (CN); Daoxin Wang, Shenzhen (CN); Huichao Hu, Shenzhen (CN); Xiaosheng Liu, Shenzhen (CN); Xiaobin Cao, Shenzhen (CN); Jie Zhou, Shenzhen (CN); Zhongjian He, Shenzhen (CN); Xiao Feng, Shenzhen (CN); Yibo Jin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 48 days.

(21) Appl. No.: 16/849,322

(22) Filed: Apr. 15, 2020

(65) Prior Publication Data

US 2020/0245019 A1 Jul. 30, 2020

Related U.S. Application Data

(63) Continuation of application No. PCT/CN2018/114499, filed on Nov. 8, 2018.

(30) Foreign Application Priority Data

Nov. 9, 2017 (CN) .......................... 201711099345.7

(51) Int. Cl.
*H04N 21/431* (2011.01)
*A63F 13/45* (2014.01)
(Continued)

(52) U.S. Cl.
CPC ......... *H04N 21/4316* (2013.01); *A63F 13/45* (2014.09); *A63F 13/52* (2014.09);
(Continued)

(58) Field of Classification Search
CPC ............. H04N 21/4316; H04N 21/437; H04N 21/4722; H04N 21/8133; A63F 13/45; A63F 13/52
See application file for complete search history.

(56) References Cited

U.S. PATENT DOCUMENTS 6,536,041 B1 * 3/2003 Knudson ............... H04N 21/235
725/39
2004/0157654 A1 8/2004 Kataoka et al.
(Continued)

FOREIGN PATENT DOCUMENTS

CN 1794249 A 6/2006
CN 102457780 A 5/2012
(Continued)

OTHER PUBLICATIONS

Replay File Enhancements In Patch 2.0.8. (May 8, 2013). Blizzard News. Retrieved from news.blizzard.com/en-GB/starcraft2/10059939/replay-file-enhancements-in-patch-2-0-8 (Year: 2013).*
(Continued)

*Primary Examiner* — Michael R Telan
(74) *Attorney, Agent, or Firm* — Anova Law Group, PLLC

(57) ABSTRACT

A data display method and apparatus, a storage medium, and an electronic device are provided. The method includes: receiving, by a terminal, a first target operation instruction on a client during a process of playing a video of a game on the client; obtaining, by the terminal, process data of a target type in response to the first target operation instruction. The process data indicates game information corresponding to a
(Continued)

current moment of the video of the game, and the game information being time-sensitive. The method also includes displaying, by the terminal, a first target interface on the client, the first target interface displaying the process data of the target type.

20 Claims, 11 Drawing Sheets

(51) Int. Cl.
*A63F 13/52* (2014.01)
*H04N 21/437* (2011.01)
*A63F 13/5372* (2014.01)
*A63F 13/795* (2014.01)

(52) U.S. Cl.
CPC ........ *H04N 21/437* (2013.01); *A63F 13/5372* (2014.09); *A63F 13/795* (2014.09); *A63F 2300/5566* (2013.01); *A63F 2300/8029* (2013.01)

(56) References Cited

U.S. PATENT DOCUMENTS

| | | | | |
|---|---|---|---|---|
| 2004/0197088 | A1* | 10/2004 | Ferman | H04N 21/426 386/251 |
| 2008/0096663 | A1* | 4/2008 | Lieberman | A63F 13/497 463/42 |
| 2010/0125884 | A1* | 5/2010 | Howcroft | H04N 21/4722 725/93 |
| 2011/0081965 | A1* | 4/2011 | Klein | H04N 21/47205 463/31 |
| 2012/0231884 | A1 | 9/2012 | Sakai | |
| 2013/0244790 | A1 | 9/2013 | Gary | |
| 2013/0282640 | A1 | 10/2013 | Lapadula, III et al. | |
| 2014/0031121 | A1* | 1/2014 | Kern | A63F 13/497 463/33 |
| 2014/0113718 | A1* | 4/2014 | Norman | A63F 13/822 463/31 |
| 2015/0360134 | A1 | 12/2015 | Rodriguez | |
| 2016/0261915 | A1* | 9/2016 | Niebres | H04N 21/4334 |
| 2017/0006074 | A1* | 1/2017 | Oates, III | H04L 65/4076 |
| 2017/0155961 | A1 | 6/2017 | Huo et al. | |
| 2017/0282079 | A1* | 10/2017 | De La Cruz | A63F 13/537 |
| 2017/0303006 | A1 | 10/2017 | Peng | |
| 2018/0054659 | A1* | 2/2018 | Goswami | H04N 21/21805 |
| 2018/0081510 | A1 | 3/2018 | Ekstrand et al. | |
| 2018/0133599 | A1* | 5/2018 | Lang | A63F 13/67 |

FOREIGN PATENT DOCUMENTS

| | | |
|---|---|---|
| CN | 102752530 A | 10/2012 |
| CN | 103366083 A | 10/2013 |
| CN | 104811814 A | 7/2015 |
| CN | 105430508 A | 3/2016 |
| CN | 105657567 A | 6/2016 |
| CN | 105812889 A | 7/2016 |
| CN | 107077648 A | 8/2017 |
| CN | 107998655 A | 5/2018 |
| EP | 1172132 A2 | 1/2002 |

OTHER PUBLICATIONS

Crysumpt. (Nov. 29, 2016). Unofficial Beta Client Guide and a Walkthrough on all the Client [Online forum post], Reddit. reddit.com/r/funny/comments/9ihsdp/fantastic_view_from_google_earth/ (Year: 2016).*
Crysumpt. (Nov. 24, 2016) [the hyperlink "graphs" directs to an image], Imgur. i.imgur.com/NLFNROB.png (hereinafter referred to as "Image 1") (Year: 2016).*
The State Intellectual Property Office of the People's Republic of China (SIPO) Office Action 1 for 201711099345.7 dated Jun. 3, 2020 13 Pages (including translation).
The World Intellectual Property Organization (WIPO) International Search Report for PCT/CN2018/114499 Feb. 1, 2019 6 Pages (including translation).

* cited by examiner

DATA DISPLAY METHOD AND APPARATUS, STORAGE MEDIUM, AND ELECTRONIC DEVICE

CROSS-REFERENCES TO RELATED APPLICATIONS

This application is a continuation application of PCT Patent Application No. PCT/CN2018/114499, filed on Nov. 8, 2018, which claims priority to Chinese Patent Application No. 201711099345.7, filed with the Chinese Patent Office on Nov. 9, 2017 and entitled "DATA DISPLAY METHOD AND APPARATUS, STORAGE MEDIUM, AND ELECTRONIC DEVICE", both of which are incorporated herein by reference in their entirety.

FIELD OF THE TECHNOLOGY

The present disclosure relates to the field of computers, and specifically, to a data display method and apparatus, a storage medium, and an electronic device.

BACKGROUND OF THE DISCLOSURE

Currently, data may be displayed when a video is played. For example, competition/game event data may be displayed when a live or on-demand video is played.

Generally, for display of competition event data in a variety of live videos, a director usually actively invokes a competition event data interface, and displays the competition event data interface to an event viewer in a video interface, while the event viewer cannot autonomously determine when to view the competition event data and what data to view, resulting in relatively low data display flexibility.

In addition, display of competition event data in a variety of on-demand videos is usually combined with the World Wide Web (Web) for display. In this case, content of a competition event video can be normally played, but entire competition event data is presented in a Web page, and a user cannot autonomously adjust the display of the competition event data, resulting in relatively low data display flexibility.

At present, for the foregoing problem of low data display flexibility when a video is played, no effective solution has been proposed.

SUMMARY

Embodiments of the present disclosure provide a data display method and apparatus, a storage medium, and an electronic device, to resolve at least a technical problem of low data display flexibility when a video of a game is played in the related art.

According to an aspect of the embodiments of the present disclosure, a data display method is provided, including: receiving, by a terminal, a first target operation instruction on a client during a process of playing a video of a game on the client; obtaining, by the terminal, process data of a target type in response to the first target operation instruction. The process data indicates game information corresponding to a current moment of the video of the game, and the game information being time-sensitive. The method also includes displaying, by the terminal, a first target interface on the client, the first target interface displaying the process data of the target type.

According to another aspect of the embodiments of the present disclosure, an electronic device is further provided, including a memory and a processor, the memory storing a computer program, and the processor being configured to run the computer program to perform: receiving a first target operation instruction on a client during a process of playing a video of a game on the client; and obtaining process data of a target type in response to the first target operation instruction. The process data indicates game information corresponding to a current moment of the video of the game, and the game information being time-sensitive. The processor is also configured to display a first target interface on the client, the first target interface displaying the process data of the target type.

According to another aspect of the embodiments of the present disclosure, a non-transitory storage medium is further provided, storing a computer program, the computer program being configured to perform: receiving a first target operation instruction on a client during a process of playing a video of a game on the client; and obtaining process data of a target type in response to the first target operation instruction. The process data indicates game information corresponding to a current moment of the video of the game, and the game information being time-sensitive. The computer program is also configured to perform: displaying a first target interface on the client, the first target interface displaying the process data of the target type.

BRIEF DESCRIPTION OF THE DRAWINGS

The accompanying drawings described herein are intended to provide a further understanding of the embodiments of the present disclosure and constitute a part of the present disclosure. The exemplary embodiments of the present disclosure and description thereof are intended to explain the present disclosure, and not to constitute an improper limitation on the present disclosure. In the accompanying drawings.

DESCRIPTION OF EMBODIMENTS

To make a person skilled in the art better understand solutions of the present disclosure, the following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between similar objects but do not necessarily indicate a specific order or sequence. It is to be understood that data used in this way is exchangeable in a proper case, so that the embodiments of the present disclosure described herein can be implemented in another order except those shown or described herein. In addition, terms "include" and "have" and any of their variations are intended to cover nonexclusive including, for example, a process, method, system, product, or device that includes a series of steps or units do not have to be limited to those clearly listed steps or units, but may include another step or unit that is not clearly listed or is inherent to such a process, method, product, or device.

According to an aspect of the embodiments of the present disclosure, an embodiment of a data display method is provided.

Figure 1:
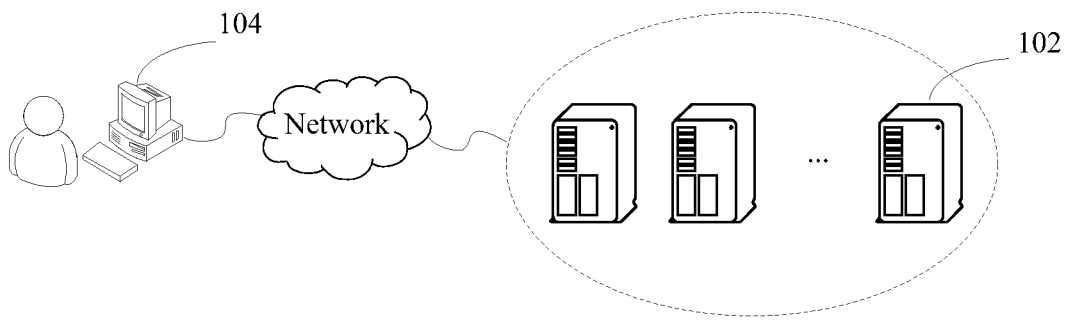
FIG. 1 is a schematic diagram of a hardware environment of a data display method according to an embodiment of the present disclosure.

Optionally, in some embodiments, the data display method may be applied to a hardware environment including a server 102 and a terminal 104, as shown in FIG. 1. FIG. 1 is a schematic diagram of a hardware environment of a data display method according to an embodiment of the present disclosure. As shown in FIG. 1, the server 102 is connected to the terminal 104 through a network. The network includes, but is not limited to, a wide area network, a metropolitan area network, and a local area network. The terminal 104 is not limited to a PC, a mobile phone, a tablet computer, and the like. The data display method in some embodiments of the present disclosure may be performed by the server 102, or may be performed by the terminal 104, or may be performed by the server 102 together with the terminal 104. The terminal 104 performs the data display method in some embodiments of the present disclosure.

Figure 2:
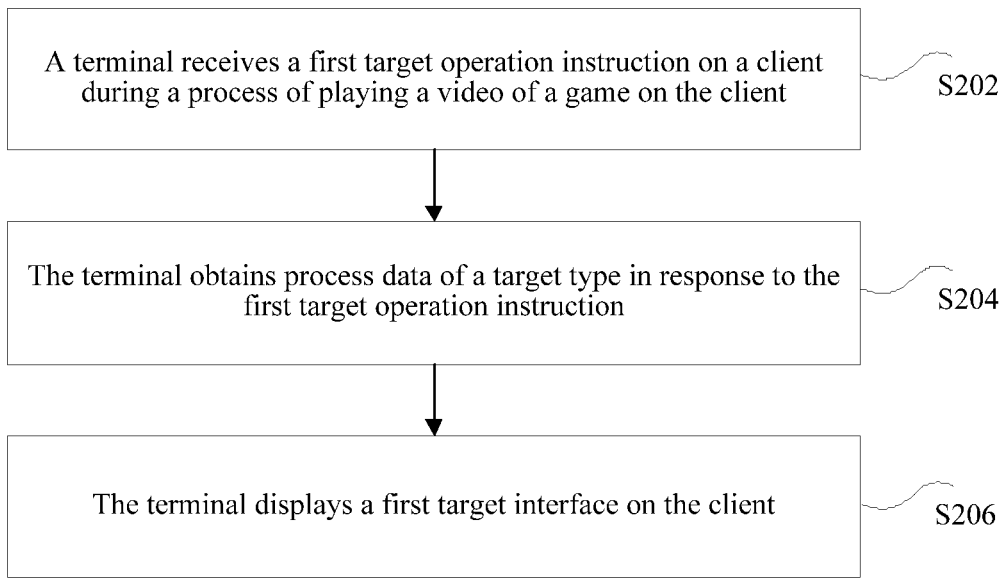
FIG. 2 is a flowchart of a data display method according to an embodiment of the present disclosure.

FIG. 2 is a flowchart of a data display method according to an embodiment of the present disclosure. As shown in FIG. 2, the method may include the following steps:

Step S202. A terminal receives a first target operation instruction on a client during a process of playing a video of a game on the client.

In the technical solution provided in step S202 of the present disclosure, in some embodiments, the client may be a game client configured to play the video of the game, or the client may be a browser, a front end page (Web page), or the like. The video of the game in some embodiments may be a game event (e.g., competition event) video, for example, a League of Legends (LOL) game event video. The client may play a live video of the game and an on-demand video of the game.

The terminal receives the first target operation instruction on the client during the process of playing the video of the game on the client. The first target operation instruction is used for instructing to display the process data of the target type during the process of playing the video of the game, which may be used for instructing to display the process data of the target type during the process of playing the live video of the game, and may also be used for instructing to display the process data of the target type during the process of playing the on-demand video of the game. The process data may be data corresponding to a game process during the process of playing the video of the game. The game process may be used for indicating how the game is going, for example, used for indicating a progress, an achievement, or game behavior of a game competition event.

Optionally, the first target operation instruction in some embodiments may be triggered by a user by operating a function button in an interface of the client, so that the user may autonomously select data of a type to be watched. The user may be a competition event user, and function buttons in the interface of the client correspond to types of process data. For example, the user clicks/taps a function button A in the interface of the client, and process data of a type A' corresponding to the function button A is displayed.

Step S204. The terminal obtains process data of a target type in response to the first target operation instruction.

In the technical solution provided in step S204 of the present disclosure, the process data is used for indicating information about a game process corresponding to a current moment of the video of the game.

After receiving the first target operation instruction on the client, the terminal obtains the process data of the target type in response to the first target operation instruction. The process data may be used for indicating the information about the game process corresponding to the current moment of the video of the game, for example, used for indicating related information of a game competition event corresponding to the current moment in the video of the game, such as a progress, an achievement, or game behavior.

Optionally, the process data in some embodiments is competition event data corresponding to the current moment of the video of the game, used for indicating competition event information corresponding to the current moment of the video of the game; the process data is game behavior data, used for indicating game behavior information corresponding to the current moment of the video of the game; the process data is player behavior data, used for indicating player behavior information corresponding to the current moment of the video of the game, or the like.

Optionally, there are a plurality of types of process data when the terminal plays the video of the game on the client. For example, when the terminal plays an LOL competition event video on the client, the process data may be data of a type corresponding to a heatmap (e.g., showing places one or more game characters have been to on the map, or showing traffic on different locations on the map), used for indicating information about a heatmap event corresponding to the current moment in the video of the game; the process data may be data of a type corresponding to a battle position (e.g., a position where one user-controlled game character kills/defeats another user-controlled game character), used for indicating address information of a kill event corresponding to the current moment in the video of the game; the process data may be data of a type corresponding to team damage dealt, used for indicating information about a team damage dealt event corresponding to the current moment in the video of the game; the process data may be data of a type corresponding to economics and experience curves, used for indicating information, corresponding to the current moment and related to economics and experience events, of the video of the game; the process data may be data of a type corresponding to a most valuable player (MVP) score, used for indicating information about an MVP score corresponding to the current moment in the video of the game, or the like. No limitation is set herein.

Optionally, types of the process data in some embodiments further include: a type corresponding to a battle position, a type corresponding to blocking of a player, a type corresponding to a current field of view, a type corresponding to ward insertion/removal, a type corresponding to team damage dealt, a type corresponding to team damage taken, a type corresponding to total property, a type corresponding to an economics curve, a type corresponding to an experience curve, a type corresponding to an MVP score, and the like. No limitation is set herein.

Optionally, process data corresponding to the types corresponding to a battle position, ward insertion/removal, and a current field of view includes: identifiers (IDs) of heroes used by two parties, a total quantity of kills (a total quantity of wards and a quantity of current effective wards), a total quantity of deaths (a total quantity of wards removed), coordinate values of where an enemy is killed (coordinate values of a ward inserted and coordinate values of a current effective ward), coordinate values of death (coordinate values of a ward removed or expired), and the like. No limitation is set herein.

Optionally, process data of the type corresponding to a blocking place includes: IDs of heroes used by two parties, coordinate values of where a player stops on a map, and the like. No limitation is set herein.

Optionally, process data of the types corresponding to team damage dealt and team damage taken includes: IDs of heroes used by two parties, a value of damage caused (or received) by a player, and the like. No limitation is set herein.

Optionally, process data of the types corresponding to an economics curve and an experience curve includes: economics (experience) differences generated by two parties every five seconds, and the like. No limitation is set herein.

The process data of the target type may be data in a Json array. The terminal may transmit a request to a front end server (Web server), to notify the front end server of a need to obtain the process data of the target type. After determining the need to obtain the process data of the target type, the front end server may obtain the process data of the target type from a data server. The data server is configured to store process data corresponding to the game during the process of playing the video of the game. The terminal may report process data corresponding to the game during the process of playing the video of the game to the data server in real time for extraction by the front end server according to a need.

Optionally, the front end server extracts, from the data server, latest process data of the target type corresponding to the game during the process of playing the video of the game and, and returns the process data of the target type to the client, for example, returns the process data of the target type to the front end page. In this way, the process data of the target type is obtained.

Optionally, when the terminal plays the video of the game that is currently on-demand on the client, the front end server determines, by using a page parameter transmitted by the client in response to the first target operation instruction, a specific competition in the video of the game that is currently on-demand. The terminal may automatically invoke process data of a current game round in the game according to information notified by the front end server, and perform selection in the process data of the current game round according to a play progress of the video of the game, to extract process data of the target type that is closest to the play progress of the video. In this way, event data is adjusted according to the play progress of the video of the game.

Step S206. The terminal displays a first target interface on the client.

In the technical solution provided in step S206 of the present disclosure, the first target interface displays the process data of the target type.

After the terminal obtains the process data of the target type in response to the first target operation instruction, the client may process the process data of the target type, and display the process data of the target type in the first target interface that is user-understandable. The first target interface is a display interface in a target form. The target form is in one-to-one correspondence with the target type. Optionally, the terminal converts the process data of the target type into a user-understandable battle position, team damage dealt, heatmap, or economics or experience curve interaction interface for display to the user, and renders the interface and presents the interface to the user.

Optionally, the terminal may fill the process data of the target type into a target page template. In the target page template, the process data of the target type is rendered to obtain the first target interface for display to the user. In this way, data visualization is achieved. Data visualization is a scientific and technical study of visual representation of data, which is defined as a type of information extracted in a form of summary, including various attributes and variables of a corresponding information unit.

Optionally, the terminal fills process data of the battle position, ward insertion/removal, and current field of view types into a simulated game map for display, and through an interaction interface, the user may see details of heroes used by two parties, where a hero generates a kill, where a ward is inserted, a location of a current effective ward, where the hero is killed, and where a ward of the other party is removed.

Optionally, the terminal may employ a third-party hotspot depiction component to fill process data of the blocking place type into a virtual game map in a page for rendering, to obtain a hotspot visualization map. In the hotspot visualization map, a location where a hero stops a longer time is presented in a color state, for example, red, while a location where a hero stops a short time is presented in another color state, for example, green.

Optionally, the terminal calculates process data of the team damage dealt and team damage taken types and converts the process data into a bar chart for rendering in a page template and display to the user.

Optionally, the terminal draws process data of the economics curve and experience curve types on a canvas for rendering and display to the user.

By performing step S202 and step S206, a terminal receives a first target operation instruction on a client during a process of playing a video of a game on the client; the terminal obtains process data of a target type in response to the first target operation instruction, the process data being used for indicating information about a game process corresponding to a current moment of the video of the game; and the terminal displays a first target interface on the client, the first target interface displaying the process data of the target type. The process data of the target type during the process of playing the video of the game is displayed to a user through data visualization, and a response can be immediately made to the target operation instruction during the process of playing the video of the game. Therefore, the user can view the process data of the target type anytime, and when watching the video of the game (on-demand or live), audience may view game information (for example, a heatmap and an MVP score) corresponding to the current moment of the video of the game. In this way, data display flexibility when the video of the game is played is improved, and user experience is improved, thereby resolving the technical problem of low data display flexibility when a video of a game is played in the related art.

In an optional implementation, step S204 of obtaining, by the terminal, process data of a target type includes: transmitting, by the terminal, a first request to a first server during the process of playing the video of the game that is currently live on the client, where the first request is used for requesting to obtain the process data of the target type from the first server; and receiving, by the client on the terminal, the process data of the target type that is transmitted by the first server in response to the first request.

The video of the game played by the client on the terminal includes two forms: a live video of the game and an on-demand video of the game. The terminal transmits the first request to the first server during the process of playing the video of the game that is currently live on the client. The first server may be the front end server. The first request is used for requesting to obtain the process data of the target type from the first server. The first request may be an ajax request. When the terminal transmits the ajax request to the first server, the front end page does not need to be refreshed. Therefore, no impact is caused when the user watches the played video of the game, thereby improving user experience. After the first server receives the first request, the first server determines, in response to the first request, which type of process data the client needs to obtain. After the first server obtains the process data of the target type, the first server transmits the process data of the target type. The terminal receives the process data of the target type on the client. In this way, the process data of the target type is obtained during the process of playing the video of the game that is currently live on the client.

In an optional implementation, the receiving, by the client on the terminal, the process data of the target type that is transmitted by the first server in response to the first request includes: receiving, by the client on the terminal, the process data of the target type that is obtained by the first server from a target database in response to the first request.

After the first server determines, in response to the first request, which type of process data the client needs to obtain, the first server may obtain the process data of the target type from the target database. The target database may be the data server, and may store process data according to different types. The process data of the target type may be new process data that corresponds to the game during the process of playing the video of the game and that is stored in the target database, for example, new competition event data that corresponds to the game during the process of playing the video of the game and that is stored in the target database. All process data corresponding to the game when the terminal plays the video of the game is reported by a game server to the target database in real time, and stored in the target database.

In an optional implementation, before step S202 of receiving, by a terminal, a first target operation instruction on a client, the method further includes: displaying, by the terminal, indication information corresponding to each of a plurality of types on the client in a case that the video of the game that is currently live is present, where the indication information is associated with process data of one of the plurality of types; and step S202 of receiving, by a terminal, a first target operation instruction on a client includes: receiving, by the client on the terminal, the first target operation instruction that is generated by using indication information corresponding to the target type.

Before the terminal receives the first target operation instruction on the client, the front end server determines whether the video of the game that is currently live is present, for example, determines whether a competition is currently live. If determining that the video of the game that is currently live is present, the front end server displays the indication information corresponding to each of the plurality of types on the client. The indication information may be matched with process data of the type corresponding to the indication information. For example, indication information 1 may be matched with the process data corresponding to the battle position type, and the indication information 2 may be matched with process data corresponding to a team battle data type. Optionally, the indication information may be a visualization function module, for example, a function button in the interface of the client, and may be used for indicating process data of a type. Process data of a specific competition may be obtained through matching by using the function button. The terminal receives, on the client, the first target operation instruction generated by using the indication information corresponding to the target type. For example, the indication information corresponding to the target type is a function button, the user triggers the first target operation instruction by operating the function button, the terminal requests the process data of the target type from the front end server, the front end server extracts the process data of the target type from the data server, and transmits the process data to the client, and the terminal renders the process data into the target interface displaying the process data of the target type.

In an optional implementation, before the receiving, by a terminal, a first target operation instruction on a client, the method further includes: hiding, by the terminal, indication information corresponding to each of a plurality of types on the client in a case that the video of the game that is currently live is absent, where the indication information is associated with process data of one of the plurality of types.

Before the terminal receives the first target operation instruction on the client, if the front end server determines that the video of the game that is currently live is absent, the terminal hides the indication information corresponding to each of the plurality of types on the client. For example, a visualization function module corresponding to each of the plurality of types of the video of the game may be hidden.

In an optional implementation, before step S202 of receiving, by a terminal, a first target operation instruction on a client, the method further includes: transmitting, by the terminal, a page parameter of a target page to a first server during the process of playing the video of the game that is on-demand on the client, where the page parameter of the target page is used for instructing to obtain process data of a current game round in the game; and receiving, by the client on the terminal, the process data of the current game round transmitted by the first server; and step S204 of obtaining, by the terminal, process data of a target type includes: obtaining, by the terminal, a play progress of the video of the game at the current moment; and selecting, by the terminal, process data of the target type corresponding to a target range of the play progress from the process data of the current game round.

The playing, by the terminal, a video of a game on the client may be playing the video of the game that is on-demand on the client. The on-demand video of the game may be an on-demand recorded video. Before the terminal receives the first target operation instruction on the client, the terminal transmits the page parameter of the target page to the first server during the process of playing the video of the game that is on-demand on the client. The page parameter may be used for instructing to obtain the process data of the current game round in the game, and may be a parameter corresponding to a function button in the interface of the client. The front end server may determine, according to the page parameter, which competition in the video of the game the user is watching. The front end server may store entire process data of the video of the game. The terminal may automatically invoke the process data, stored in the front end server, of the current game round according to information transmitted by the front end server, and initialize the process data of the current game round. The process data of the current game round may be current normal competition event data. The process data may be initialized to store information shared between function buttons. In this way, when process data corresponding to the shared information is obtained next time, the front end server may not be requested again, but instead, the process data is directly read, thereby reducing a data loading time and improving user experience.

In some embodiments, when obtaining the process data of the target type, the terminal may obtain the play progress of the video of the game at the current moment when the user clicks/taps a function button in the interface of the client. The play progress is a progress where the user currently watches the video of the game. After the terminal obtains the play progress of the video of the game at the current moment, the terminal selects the process data of the target type corresponding to the target range of the play progress from the process data of the current game round. The target range of the play progress may be play progresses closest to the play progress, and a type of process data generated in the play progress is the target type. In this way, selection is performed in normal process data to obtain the process data of the target type during the process of playing the video of the game that is on-demand, and the terminal displays the first target interface on the client, thereby improving data display flexibility.

In an optional implementation, the receiving, by the client on the terminal, the process data of the current game round transmitted by the first server includes: receiving, by the client on the terminal, the process data of the current game round obtained by the first server from a target database.

In some embodiments, all completed historical process data of the video of the game is stored in the target database, for example, stored in the data server. The target database may classify and store all the completed historical process data. The process data of the current game round may be obtained by the first server from the target database.

In an optional implementation, before step S202 of receiving, by a terminal, a first target operation instruction on a client, the method further includes: presenting, by the client on the terminal, information of the target type on a play progress bar of the video of the game during the process of playing the video of the game that is on-demand on the client, where a location at which the information of the target type is presented on the play progress bar is used for indicating a time corresponding to the process data of the target type during the process of playing the video of the game that is on-demand on the client.

In some embodiments, the play progress of the game may be indicated by the play progress bar. Before the terminal receives the first target operation instruction on the client, the terminal presents, on the client, the information of the target type on the play progress bar of the video of the game during the process of playing the video of the game that is on-demand on the client, that is, when the terminal starts to play a recorded video. The information of the target type may be requesting battle position data information, requesting team damage dealt data information, requesting heatmap data information, requesting economics and experience curve data information, and the like. Optionally, the front end server returns the information of the target type, for example, requesting team battle data information, transmitted by the data server. After obtaining the information of the target type returned by the front end server, the front end page presents the information of the target type on the play progress bar of the video of the game, to notify the user of a time point at which the process data of the target type is generated. For example, after obtaining team battle information returned by the front end server, the front end page presents the team battle information on the play progress bar of the video of the game, which may present the team battle information on the play progress bar of the video of the game by using a special symbol, to notify the user of a time point at which a team battle occurs, thereby improving data display flexibility.

In an optional implementation, step S206 of displaying, by the terminal, a first target interface on the client includes: adding, by the client on the terminal, the process data of the target type to a target template, where the target template is used for rendering the process data of the target type; and displaying, by the terminal, the first target interface that is obtained by rendering the process data of the target type by using the target template.

In this implementation, after the terminal obtains the process data of the target type on the client, the terminal adds, on the client, the process data of the target type to the target template. The target template is a page template, for example, a Hyper Text Markup Language (HTML) template, and renders the process data of the target type for the user. Optionally, process data in different Json arrays is filled into the HTML page template for interface rendering and display to the user. In this way, the first target interface obtained by the target template by rendering the process data of the target type is displayed, thereby achieving data visualization and improving data display flexibility.

In an optional implementation, after step S206 of displaying, by the terminal, a first target interface on the client, the method further includes: receiving, by the terminal, a second target operation instruction in the first target interface, where the second target operation instruction is used for instructing to display subprocess data of the process data of the target type; obtaining, by the terminal, the subprocess data of the process data of the target type in response to the second target operation instruction; and displaying, by the terminal, a second target interface on the client, where the second target interface displays the subprocess data of the process data of the target type.

In some embodiments, after displaying the first target interface on the client, the terminal may further receive the second target operation instruction in the first target interface. The second target operation instruction is used for instructing to display the subprocess data of the process data of the target type. That is, the subprocess data may be further displayed by using the process data of the target type. The subprocess data may be more detailed data relative to the process data, and may be triggered by the user by operating a function button in the interface of the client. In this way, the user may autonomously select data of a type to be watched.

For example, the subprocess data of the process data of the target type is team battle data. In a displayed team damage dealt function interface, an interface including data of a previous team battle is displayed, and team battle data within a specific time period is further selected by using a team battle selection button. For example, team battle data within 22:34 to 23:04 is selected. After the terminal obtains the subprocess data of the process data of the target type, the terminal displays the second target interface on the client. The second target interface displays the team battle data within 22:34 to 23:04 in process data whose type is the team damage dealt type.

Figure 3:
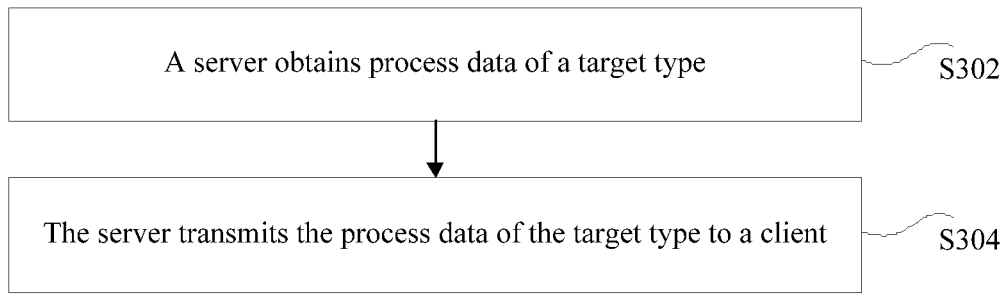
FIG. 3 is a flowchart of another data display method according to an embodiment of the present disclosure.

FIG. 3 is a flowchart of another data display method according to an embodiment of the present disclosure. As shown in FIG. 3, the method may include the following steps:

Step S302. A server obtains process data of a target type.

In the technical solution provided in step S302 in the present disclosure, the process data of the target type is displayed as instructed by a first target operation instruction received by a client, and the process data is used for indicating information about a game process corresponding to a current moment of a video of a game.

In some embodiments, the server may be a front end server. For the process data of the target type obtained by the server, the server may obtain the process data of the target type from a target database. A terminal may transmit a request to the server, to notify the server of a need to obtain the process data of the target type. After determining the need to obtain the process data of the target type, the server may obtain the process data of the target type from a data server. The data server is configured to store process data corresponding to the game during the process of playing the video of the game. The terminal may report the process data corresponding to the game during the process of playing the video of the game to the data server in real time for extraction by the front end server according to a need.

Optionally, when the terminal plays the video of the game that is currently live on the client, the server in some embodiments extracts, from the data server, latest process data of the target type that is generated during the process of playing the video of the game, and returns the latest process data of the target type to the client, for example, returns the latest process data of the target type to a front end page. In this way, the process data of the target type is obtained.

Optionally, when the terminal plays the video of the game that is currently on-demand on the client, the server in some embodiments determines, by using a page parameter transmitted by the client in response to the first target operation instruction, a specific competition in the video of the game that is currently on-demand. The terminal may automatically invoke process data of a current game round in the game from the server according to information notified by the server, and perform selection in the process data of the current game round according to a play progress of the video of the game, to extract process data of the target type closest to the play progress of the video. In this way, event data is adjusted according to the play progress of the video of the game.

Step S304. The server transmits the process data of the target type to a client.

In the technical solution provided in step S304 of the present disclosure, a first target interface displaying the process data of the target type is displayed on the client.

After the server obtains the process data of the target type, the server transmits the process data of the target type to the client. The client may process the process data of the target type, for example, convert the process data of the target type into the first target interface that is user-understandable. The first target interface is a display interface in a target form, and displays the process data of the target type. The target form is in one-to-one correspondence with the target type. Optionally, the process data of the target type is converted into a user-understandable battle position, team damage dealt, heatmap, or economics or experience curve interaction interface for display to a user, and the interface is rendered and presented to the user.

By performing step S302 and step S304, a server obtains process data of a target type, the process data of the target type being displayed as instructed by a first target operation instruction received by a client, and the process data being used for indicating information about a game process corresponding to a current moment of a video of a game; and the server transmits the process data of the target type to the client, a first target interface displaying the process data of the target type being displayed on the client. The process data of the target type during the process of playing the video of the game is displayed to a user through data visualization, and a response can be immediately made to the target operation instruction during the process of playing the video of the game. Therefore, the user can view the process data of the target type anytime. In this way, data display flexibility when the video of the game is played is improved, thereby resolving the technical problem of low data display flexibility when a video of a game is played in the related art.

The technical solutions of the embodiments of the present disclosure are described below with reference to exemplary embodiments. A professional LOL competition is specifically used as an example for description.

The data display method according to the embodiments of the present disclosure includes a data display method for a live video and a data display method for an on-demand video. The following describes the data display method for a live video according to the embodiments of the present disclosure.

Figure 4:
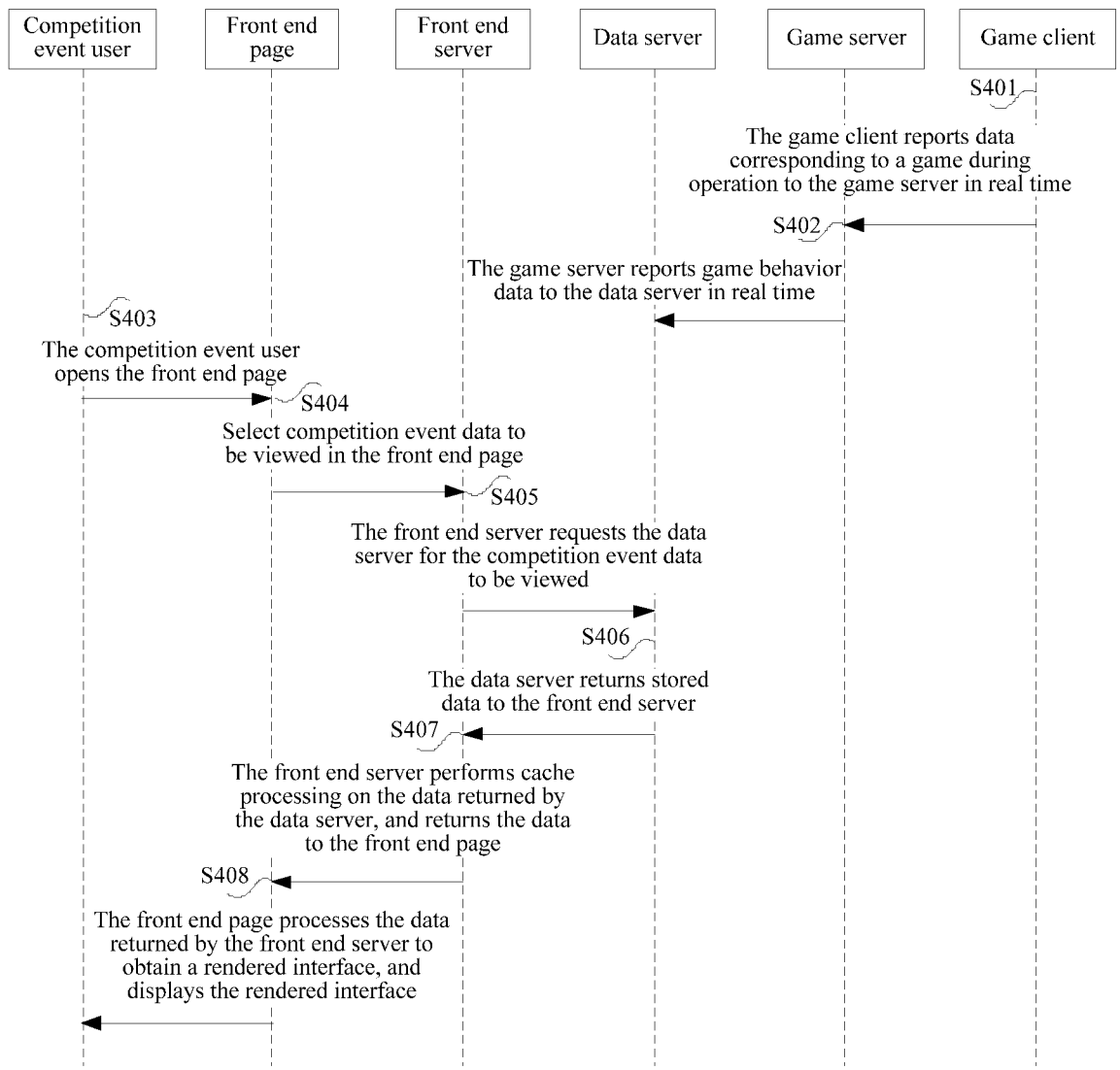
FIG. 4 is a schematic interaction diagram of a data display method for a live video according to an embodiment of the present disclosure.

FIG. 4 is a schematic interaction diagram of a data display method for a live video according to an embodiment of the present disclosure. As shown in FIG. 4, the method includes the following steps:

Step S401. A game client reports data corresponding to a game during operation to a game server in real time.

When a LOL competition event is live, a professional player operates the game client, and then the data is generated. The data includes game behavior data. The game behavior data is player behavior data, such as game behavior data of two competition parties in a battle, and competition event data, such as heatmap data, battle position data, team damage dealt data, economics and experience curves, and an MVP score. No limitation is set herein.

Step S402. The game server reports game behavior data to a data server in real time.

After the game client reports the data corresponding to the game during operation to the game server in real time, the game server reports the game behavior data to the data server in real time. The game server may extract corresponding game behavior data from operation data of the game client by analyzing information about the game client, and report the game behavior data to the data server for aggregation. The data server classifies and stores the game behavior data, for example, as battle position data, team damage dealt data, heatmap data, and economics and experience curve data. The classified and stored game behavior data may be displayed in different forms in a Web page.

Step S403. A competition event user opens a front end page.

The competition event user is a user watching a competition, and operates in the front end page (Web page). The competition event user may open the front end page through a click/tap operation.

Step S404. Select competition event data to be viewed in the front end page.

In some embodiments, a front end server determines whether a competition is currently live, and if determining that the competition is currently live, displays a data visualization function module in the front end page, and obtain data of the live competition through function module matching. If it is determined that no competition is currently live, the data visualization function module is hidden.

When the competition is currently live, competition event data to be viewed is selected in a live page of the front end page, that is, a data product to be viewed by the competition event user is selected. When the user determines, by click/tap a function button of the visualization function module in the front end page, a type of competition event data to be watched, the front end page transmits a request to the front end server to request the competition event data to be watched. The request transmitted by the front end server may be an ajax request. The page does not need to be refreshed when the ajax request is transmitted to the front end server, which is not sensed by the user, that is, normal watching experience of the user is not affected.

Step S405. The front end server requests the data server for the competition event data to be viewed.

After the competition event data to be viewed is selected in the front end page, the front end server is notified of the type of the competition event data to be provided. After the front end server receives the request, the front end server requests the data server for the competition event data to be viewed in response to the request.

Step S406. The data server returns stored data to the front end server.

After the front end server requests the data server for the data to be viewed, the data server returns the stored data to the front end server. The stored data may be latest stored competition event data.

Step S407. The front end server performs cache processing on the data returned by the data server, and returns the data to the front end page.

After the data server returns the stored data to the front end servers, the front end server performs cache processing on the data returned by the data server, and returns the data to the front end page. In this way, the front end server returns, to the front end page, the latest competition event data extracted from the data server. As the front end server performs cache processing on the data returned by the data server, when the same competition event data to be viewed is selected in the front end page, the front end server may not request the data server again for the competition event data to be viewed, so that the front end server may quickly obtain the competition event data to be viewed.

Step S408. The front end page processes the data returned by the front end server to obtain a rendered interface, and displays the rendered interface.

After the front end server performs cache processing on the data returned by the data server, and returns the data to the front end page, the front end page processes the data returned by the front end server to obtain the rendered interface, and displays the rendered interface. The front end page may render the data into different visualization interfaces according to different data types for display to the user, for example, convert the competition event data into a user-understandable battle position, team damage dealt, heatmap, or economics or experience curve interaction interface for display.

In some embodiments, a game client reports data corresponding to a game during operation to a game server in real time. The game server reports game behavior data to a data server in real time. A competition event user opens a front end page, and selects competition event data to be viewed in the front end page. A front end server requests the data server for the competition event data to be viewed. The data server returns stored data to the front end server. The front end server performs cache processing on the data returned by the data server, and returns the data to the front end page. Then the front end page processes the data returned by the front end server to obtain a rendered interface, and displays the rendered interface. In this way, data display flexibility is improved.

Figure 5:
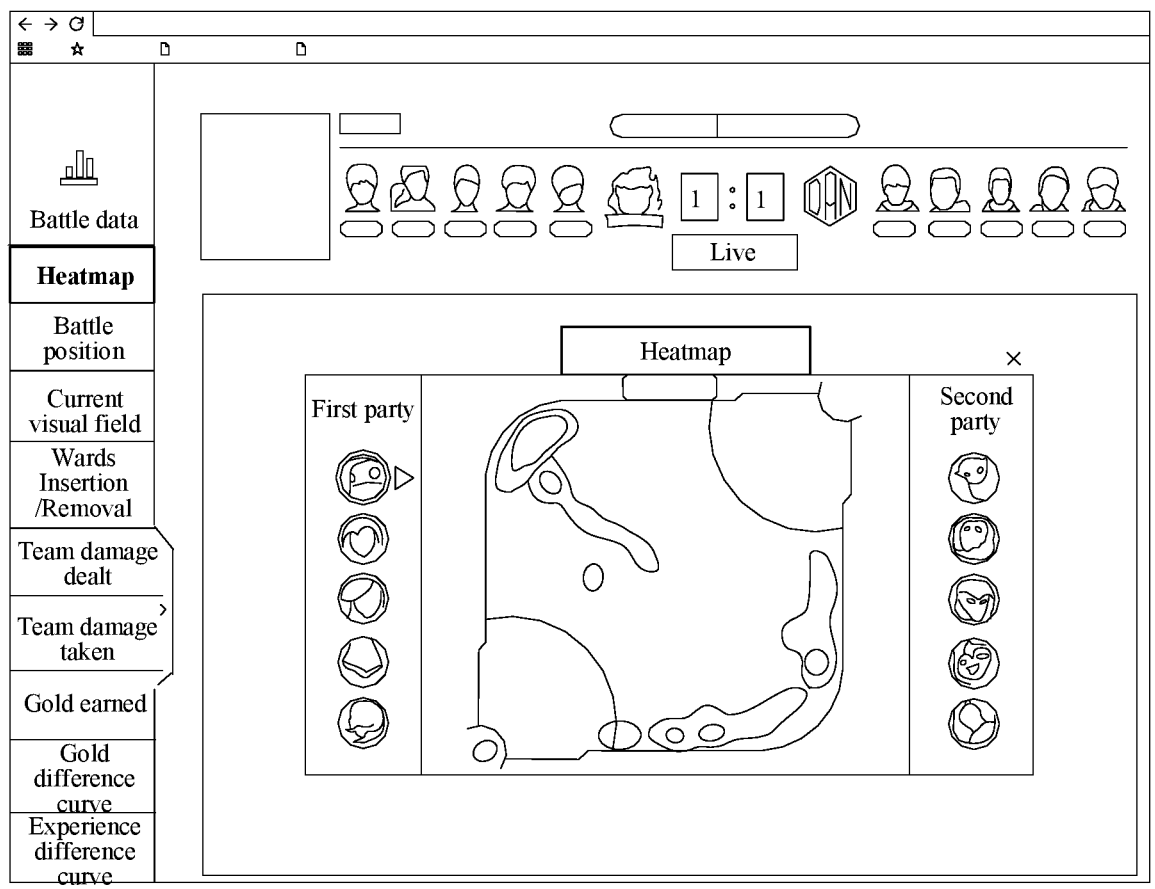
FIG. 5 is a schematic interface diagram of a heatmap function in a live video according to an embodiment of the present disclosure.

FIG. 5 is a schematic interface diagram of a heatmap function in a live video according to an embodiment of the present disclosure. As shown in FIG. 5, the competition event user opens the front end page, clicks/taps a heatmap function button displayed on a left side of the front end page, that is, selects data of a heatmap type to be viewed in the front end page, and transmits, to the front end server, a request for obtaining the data of the heatmap type. After receiving the request, the front end server requests, in response to the request, the data server for the data of the heatmap type to be viewed. The data server returns stored data of the heatmap type to the front end server. The front end server performs cache processing on the data of the heatmap type returned by the data server, and returns the data of the heatmap type to the front end page. The front end page processes the data of the heatmap type returned by the front end server to obtain a rendered interface, and displays a heatmap map. The heatmap map includes heatmap information of a first party and a second party.

Optionally, a browser may employ a third-party hotspot depiction component to fill coordinate values of players on a game map into a virtual game map in the page for rendering. The user may see that a location where a hero stops a longer time is presented in a color state, while a location where a hero stops a shorter time is presented in another color state.

In some embodiments, the real-time data of the heatmap type in the professional LOL competition is displayed to the user through data visualization. When watching the live video, the user may view the real-time data of the heatmap type anytime to learn about the competition. This avoids a problem that a director autonomously invokes an interface of the real-time data of the heatmap type and displays the interface to the competition event user in a video interface, resulting in that the competition event user cannot autonomously watch the real-time data of the heatmap type, thereby improving data display flexibility and user experience.

Figure 6:
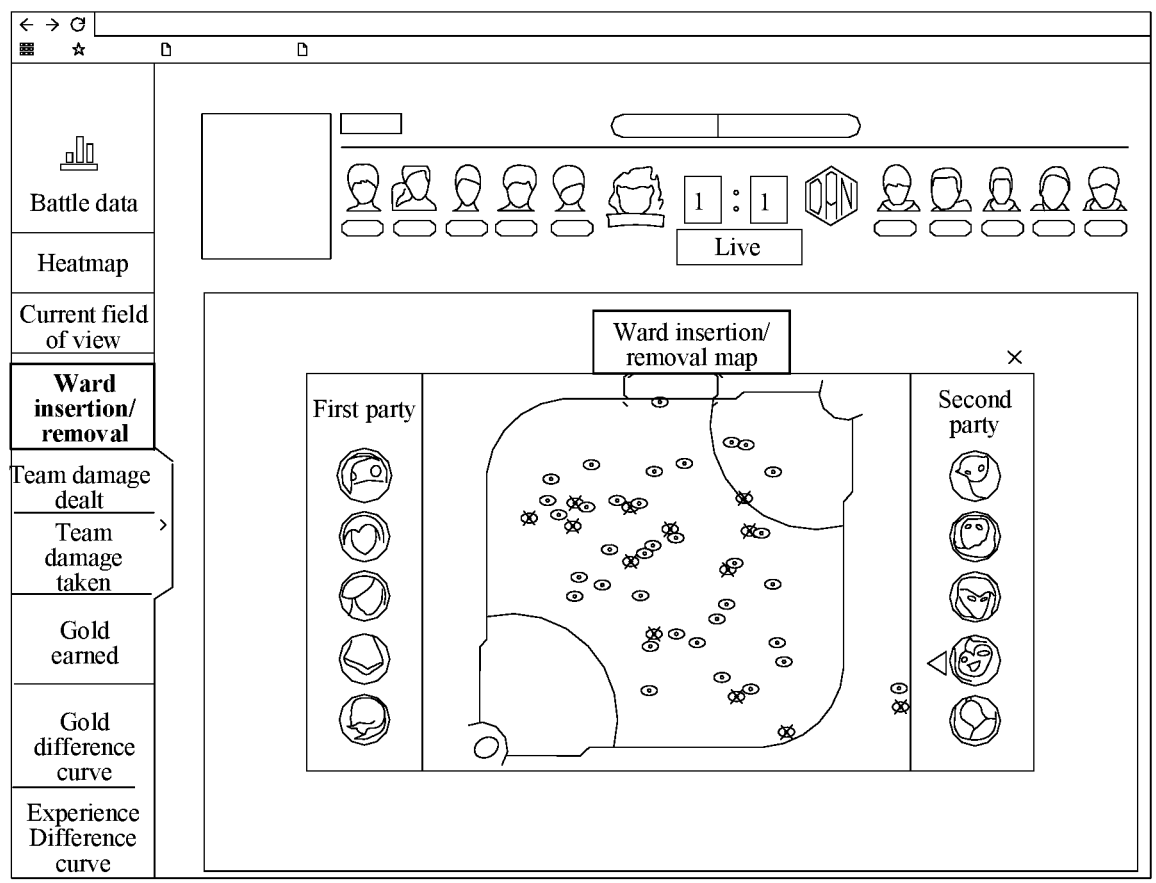
FIG. 6 is a schematic interface diagram of a ward insertion/removal function in a live video according to an embodiment of the present disclosure.

FIG. 6 is a schematic interface diagram of a ward insertion/removal function in a live video according to an embodiment of the present disclosure. As shown in FIG. 6, the competition event user opens the front end page, clicks/taps a ward insertion/removal function button displayed on a left side of the front end page, that is, selects data of a ward insertion/removal type to be viewed in the front end page, and transmits, to the front end server, a request for obtaining the data of the ward insertion/removal type. After receiving the request, the front end server requests, in response to the request, the data server for the data of the ward insertion/removal type to be viewed. The data server returns stored data of the ward insertion/removal type to the front end server. The front end server performs cache processing on the data of the ward insertion/removal type returned by the data server, and returns the data of the ward insertion/removal type to the front end page. The front end page processes the data of the ward insertion/removal type returned by the front end server to obtain a rendered interface, and displays a ward insertion/removal map. The ward insertion/removal map includes ward insertion/removal information of a first party and a second party.

In some embodiments, the real-time data of the ward insertion/removal type in the professional LOL competition is displayed to the user through data visualization. When watching the live video, the user may view the real-time data of the ward insertion/removal type anytime to learn about the competition. This avoids a problem that a director autonomously invokes an interface of the real-time data of the ward insertion/removal type and displays the interface to the competition event user in a video interface, resulting in that the competition event user cannot autonomously watch the real-time data of the ward insertion/removal type, thereby improving data display flexibility and user experience.

Figure 7:
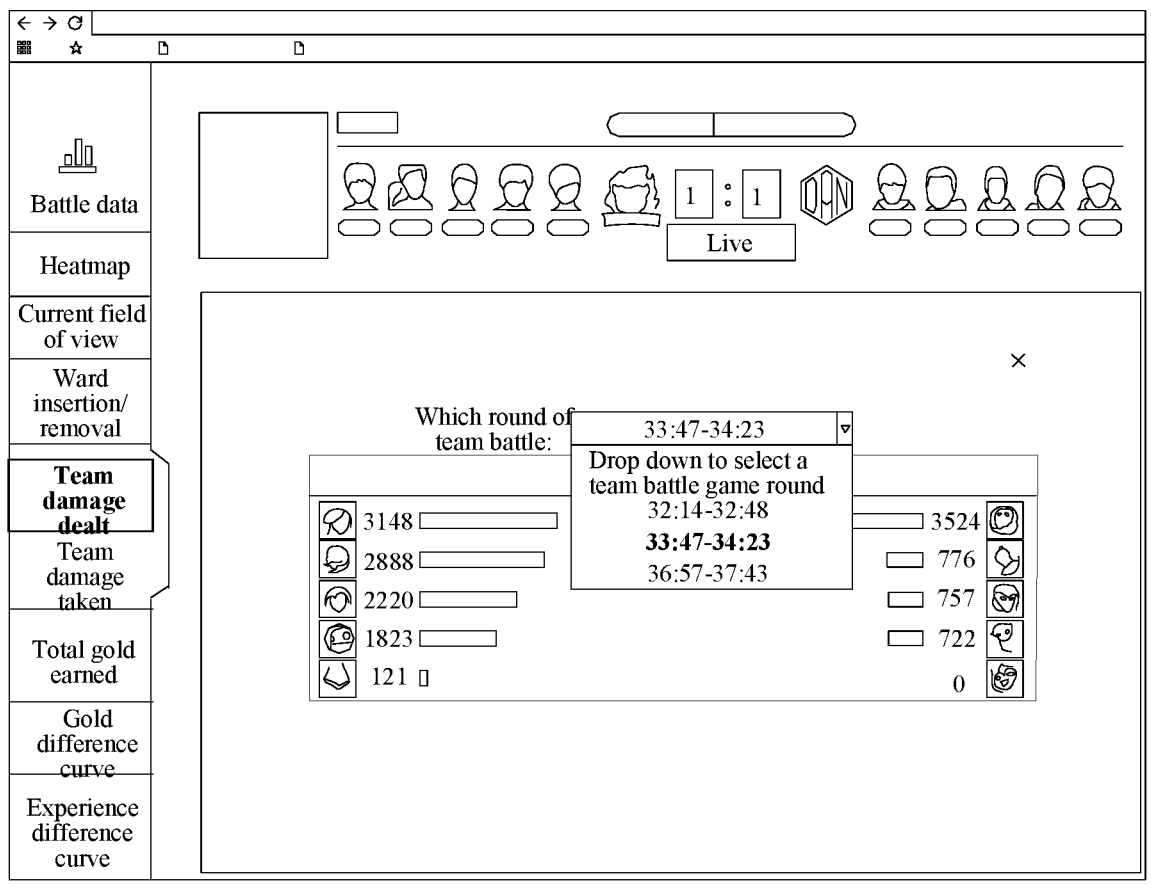
FIG. 7 is a schematic interface diagram of a team damage dealt function in a live video according to an embodiment of the present disclosure.

FIG. 7 is a schematic interface diagram of a team damage dealt function in a live video according to an embodiment of the present disclosure. As shown in FIG. 7, the competition event user opens the front end page, clicks/taps a team damage dealt function button displayed on a left side of the front end page, that is, selects data of a team damage dealt type to be viewed in the front end page, and transmits, to the front end server, a request for obtaining the data of the team damage dealt type. After receiving the request, the front end server requests, in response to the request, the data server for the data of the team damage dealt type to be viewed. The data server returns stored data of the team damage dealt type to the front end server. The front end server performs cache processing on the data of the team damage dealt type returned by the data server, and returns the data of the team damage dealt type to the front end page. The front end page processes the data of the team damage dealt type returned by the front end server to obtain a rendered interface, and displays a team damage dealt map. For example, a value of damage caused (or received) by a player in a team battle may be calculated and converted into a bar chart for rendering in a page template and display to the user, to convert data into a competition event user-understandable team damage dealt interaction interface. The team damage dealt map includes team damage dealt data of a first party and a second party.

In some embodiments, the real-time data of the team damage dealt type in the professional LOL competition is displayed to the user through data visualization. When watching the live video, the user may view the real-time data of the team damage dealt type anytime to learn about the competition. This avoids a problem that a director autonomously invokes an interface of the real-time data of the team damage dealt type and displays the interface to the competition event user in a video interface, resulting in that the competition event user cannot autonomously watch the real-time data of the team damage dealt type, thereby improving data display flexibility and user experience.

Figure 8:
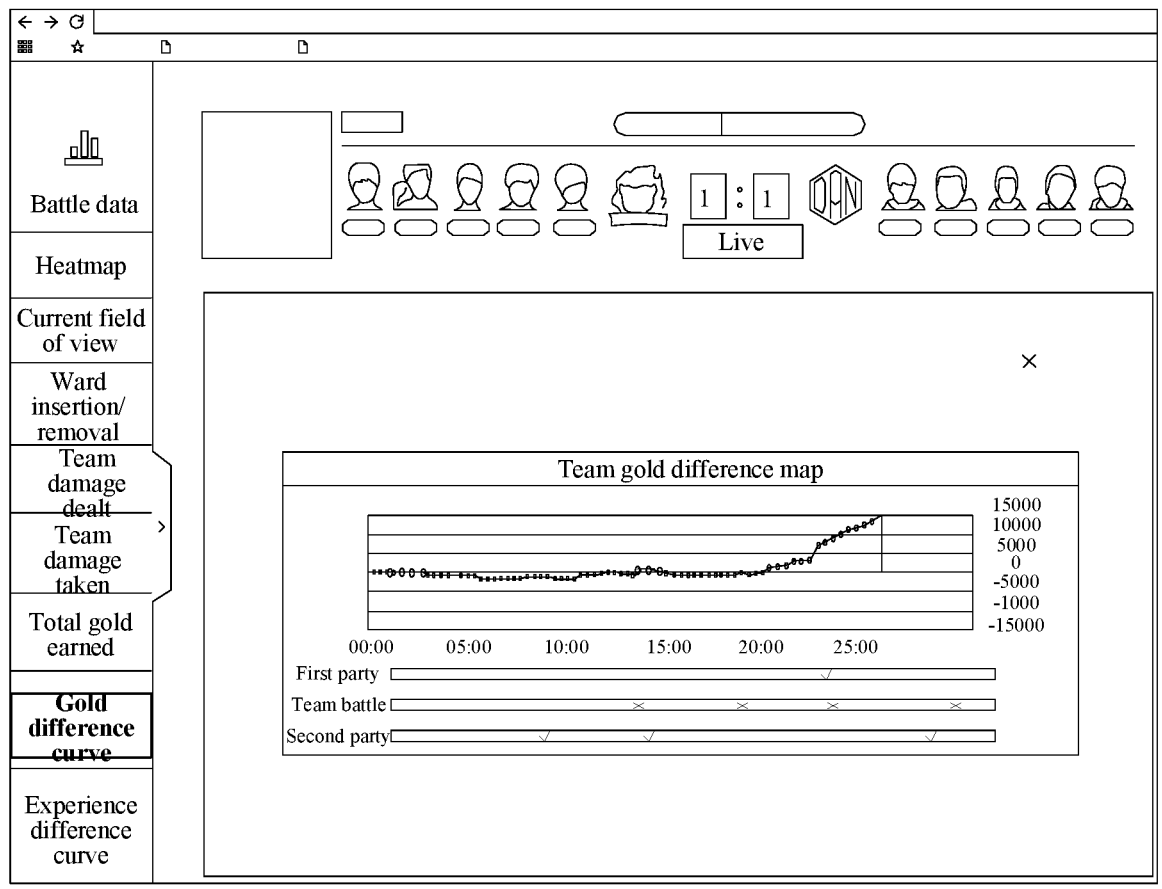
FIG. 8 is a schematic interface diagram of an economics curve function in a live video according to an embodiment of the present disclosure.

FIG. 8 is a schematic interface diagram of an economics curve function in a live video according to an embodiment of the present disclosure. As shown in FIG. 8, the competition event user opens the front end page, clicks/taps an economics curve function button displayed on a left side of the front end page, that is, selects data of an economics curve type to be viewed in the front end page, and transmits, to the front end server, a request for obtaining the data of the economics curve type. After receiving the request, the front end server requests, in response to the request, the data server for the data of the economics curve type to be viewed. The data server returns stored data of the economics curve type to the front end server. The front end server performs cache processing on the data of the economics curve type returned by the data server, and returns the data of the economics curve type to the front end page. The front end page processes the data of the economics curve type returned by the front end server to obtain a rendered interface, and displays a team economics comparison map represented by curves. The team economics comparison map includes economics data of a first party and a second party. For example, a browser draws economics (experience) differences generated by the two parties every five seconds on a canvas for rendering and display to the user.

In some embodiments, the real-time data of the economics curve type in the professional LOL competition is displayed to the user through data visualization. When watching the live video, the user may view the real-time data of the economics curve type anytime to learn about the competition. This avoids a problem that a director autonomously invokes an interface of the real-time data of the economics curve type and displays the interface to the competition event user in a video interface, resulting in that the competition event user cannot autonomously watch the real-time data of the economics curve type, thereby improving data display flexibility and user experience.

The following describes the data display method for an on-demand video according to the embodiments of the present disclosure.

Figure 9:
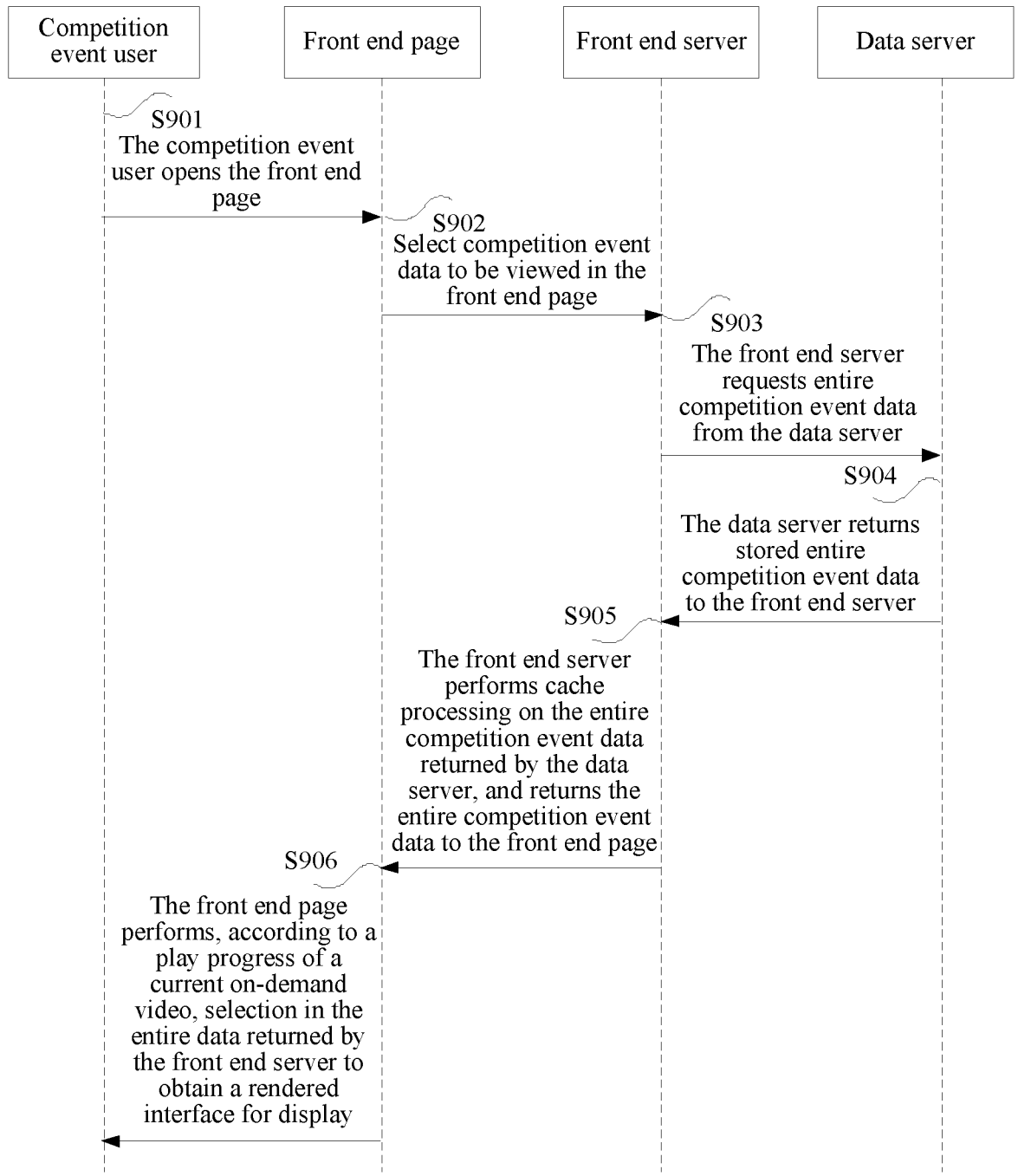
FIG. 9 is a schematic interaction diagram of a data display method for an on-demand video according to an embodiment of the present disclosure.

FIG. 9 is a schematic interaction diagram of a data display method for an on-demand video according to an embodiment of the present disclosure. As shown in FIG. 9, the method includes the following steps:

Step S901. A competition event user opens a front end page.

When the competition event user clicks/taps and opens an on-demand page in the front end page, the front end page transmits a page parameter to a front end server. The page parameter may be indication data corresponding to a function button in the page. The front end server may determine, by using the page parameter, which competition the user is watching.

Step S902. Select competition event data to be viewed in the front end page.

The user clicks/taps a function button in a visualization function module in the front end page, to determine a type of competition event data to be viewed in entire competition event data.

Step S903. The front end server requests entire competition event data from a data server.

The front end server may request all competition event data of the competition from the data server. The data server stores competition event data of all finished competitions.

Step S904. The data server returns stored entire competition event data to the front end server.

Step S905. The front end server performs cache processing on the entire competition event data returned by the data server, and returns the entire competition event data to the front end page.

The front end server performs cache processing on the entire competition event data returned by the data server, and returns the entire competition event data to the front end page. In this way, the front end server returns, to the front end page, the entire competition event data extracted from the data server. As the front end server performs cache processing on the entire competition event data returned by the data server, when the same competition event data to be viewed is selected in the front end page, the front end server may not request the entire competition event data from the data server again.

Step S906. The front end page performs, according to a play progress of a current on-demand video, selection in the entire data returned by the front end server to obtain a rendered interface for display.

The front end page may automatically invoke all the competition event data of the competition from the front end server according to information notified by the front end server, and perform initialization, that is, store shared information corresponding to the function button, so that when the competition event data of the competition is selected to be viewed, the competition event data may be directly read without requesting to invoke the competition event data again, thereby reducing a loading time for the user. The front end page obtains a watching progress of the user at a current moment, performs selection in the competition event data of the entire competition according to the current watching progress, and extracts data closest to the watching progress of the user. Optionally, the front end page may render the data into different visualization interfaces according to different data types for display to the user, for example, convert the competition event data into a user-understandable battle position, team damage dealt, heatmap, or economics or experience curve interaction interface for display.

In some embodiments, when a recorded video starts to be played, a front end server first requests needed data information from a data server. The data information needing to be obtained may be data information of an event occurring at a specific time point. For example, the front end server requests data information of a team battle. After obtaining the data information, the front end page presents the data information on a play progress bar of the on-demand video, for example, by using a special graph, to intuitively notify a competition event user of the time point at which the event corresponding to the data information occurs, for example, a time point at which the team battle occurs. When the user clicks/taps a function button in a data visualization function module, the front end page invokes entire data of the competition stored in the data server, performs selection in the obtained entire data according to a play progress of the current on-demand video, and then renders the selected data into different visualization interfaces for display to the user.

In some embodiments, the competition event user opens the front end page, and selects competition event data to be viewed in the front end page. The front end server requests entire competition event data from the data server. The data server returns stored entire competition event data to the front end server. The front end server performs cache processing on the entire competition event data returned by the data server, and returns the entire competition event data to the front end page. The front end page performs, according to the play progress of the current on-demand video, selection in the entire data returned by the front end server to obtain a rendered interface for display. In this way, data display flexibility is improved.

Figure 10:
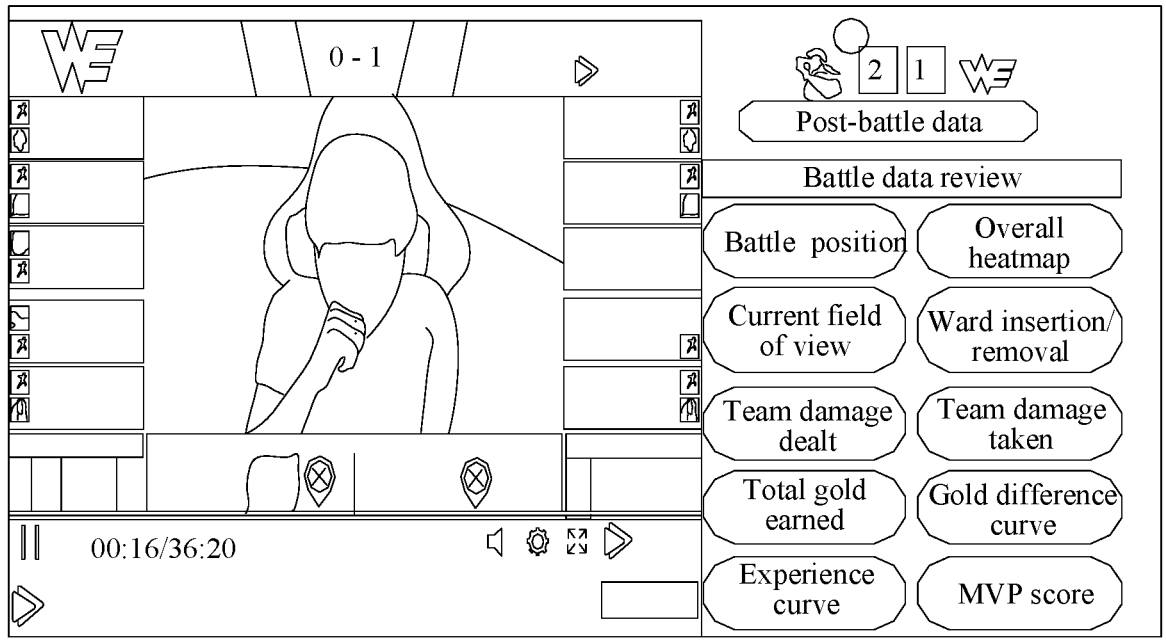
FIG. 10 is a schematic diagram of a team battle prompt on a progress bar of an on-demand video according to an embodiment of the present disclosure.

FIG. 10 is a schematic diagram of a team battle prompt on a progress bar of an on-demand video according to an embodiment of the present disclosure. As shown in FIG. 10, the user watches a recorded video. Before the recorded video starts to be played, the front end server first requests data information of a team battle from the data server. After the front end page obtains the team battle information, the front end page presents the team battle information on a play progress bar of the recorded video, for example, presents a graph with "x" on the play progress bar, to notify the user of a time point at which the team battle occurs, thereby improving data display flexibility and user experience.

Figure 11:
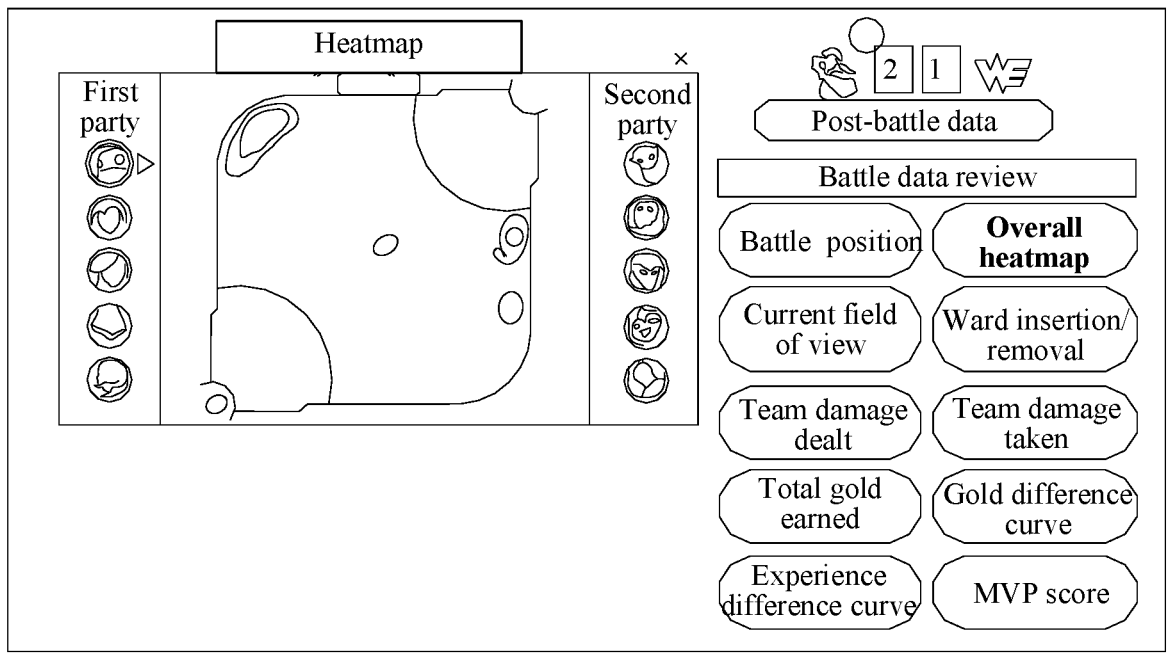
FIG. 11 is a schematic interface diagram of a heatmap function in an on-demand video according to an embodiment of the present disclosure.

FIG. 11 is a schematic interface diagram of a heatmap function in an on-demand video according to an embodiment of the present disclosure. As shown in FIG. 11, the competition event user clicks/taps and opens an on-demand page. From a page parameter, the front end server has known which competition the user is watching. The front end page automatically invokes, according to information notified by the server, all competition event data of the competition for initialization. When the competition event user clicks/taps an overall hotspot function button on a right side, the front end page performs selection in entire competition event data according to an obtained current watching progress of the user, extracts data of a hotspot type closest to the watching progress of the user, converts the data into a competition event user-understandable heatmap interaction interface, and displays the interface to the competition event user. The heatmap includes heatmap information of a first party and a second party.

Optionally, a browser may employ a third-party hotspot depiction component to fill coordinate values of players on a game map into a virtual game map in the page for rendering. The user may see that a location where a hero stops a longer time is presented in a color state, while a location where a hero stops a short time is presented in another color state. In this way, competition event data is adjusted and displayed according to the progress of the competition event user in watching the on-demand video instead of presenting entire competition event-related data in the front end page, thereby improving data display flexibility.

Figure 12:
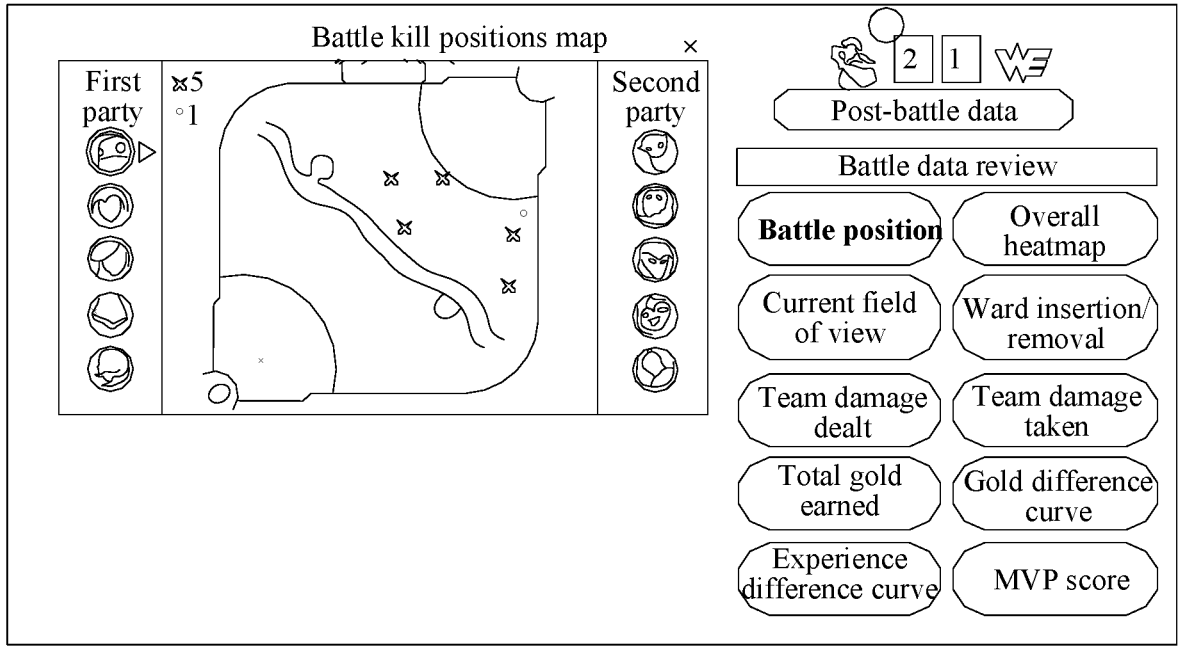
FIG. 12 is a schematic interface diagram of a battle position function in an on-demand video according to an embodiment of the present disclosure.

FIG. 12 is a schematic interface diagram of a battle position function in an on-demand video according to an embodiment of the present disclosure. As shown in FIG. 12, when the competition event user clicks/taps a battle position function button on a right side, the front end page performs selection in entire competition event data according to an obtained current watching progress of the user, extracts data of a battle position type closest to the watching progress of the user, converts the data into a competition event user-understandable kill/death map interaction interface, and displays the interface to the competition event user. The kill/death map includes battle position information of a first party and a second party. In this way, competition event data is adjusted and displayed according to the progress of the competition event user in watching the on-demand video instead of presenting entire competition event-related data in the front end page, thereby improving data display flexibility.

Figure 13:
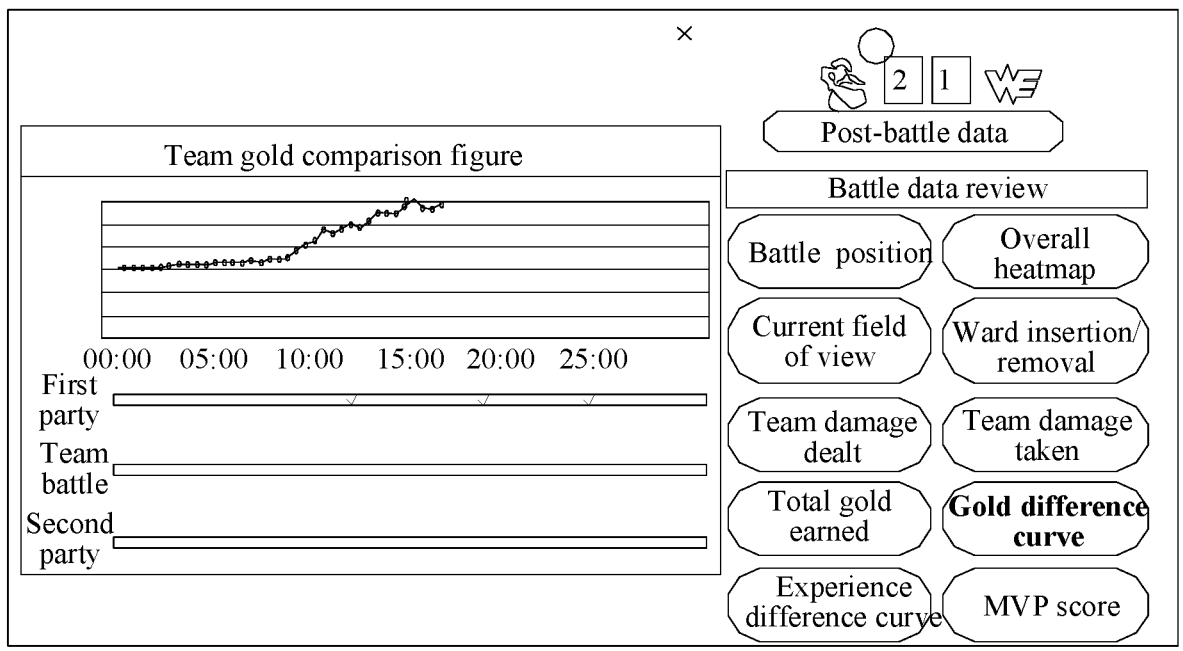
FIG. 13 is a schematic interface diagram of an economics curve function in an on-demand video according to an embodiment of the present disclosure.

FIG. 13 is a schematic interface diagram of an economics curve function in an on-demand video according to an embodiment of the present disclosure. As shown in FIG. 13, when the competition event user clicks/taps an economics curve function button on a right side, the front end page performs selection in entire competition event data according to an obtained current watching progress of the user, extracts data of an economics curve type closest to the watching progress of the user, converts the data into a competition event user-understandable team economics comparison map interaction interface, and displays the interface to the competition event user. For example, a browser draws economics (experience) differences generated by the two parties every five seconds on a canvas for rendering and display to the user. In this way, competition event data is adjusted and displayed according to the progress of the competition event user in watching the on-demand video instead of presenting entire competition event-related data in the front end page, thereby improving data display flexibility.

Figure 14:
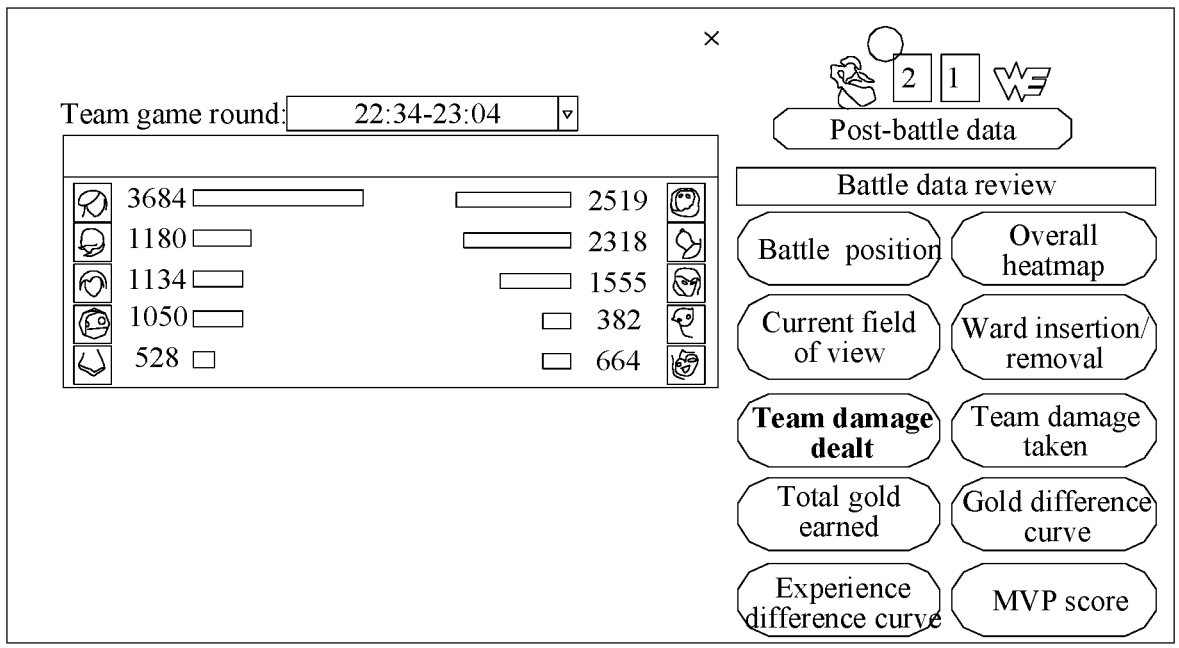
FIG. 14 is a schematic interface diagram of a team damage dealt function in an on-demand video according to an embodiment of the present disclosure.

FIG. 14 is a schematic interface diagram of a team damage dealt function in an on-demand video according to an embodiment of the present disclosure. As shown in FIG. 14, when the competition event user clicks/taps a team damage dealt function button on a right side, the front end page performs selection in entire competition event data according to an obtained current watching progress of the user, extracts data of a team damage dealt type closest to the watching progress of the user, and then may calculate a value of damage caused (or received) by a player in a team battle and convert the value into a bar chart for rendering in a page template and display to the user, to convert data into a competition event user-understandable team damage dealt interaction interface, for example, display a team battle within 22:34 to 23:04. In this way, competition event data is adjusted and displayed according to the progress of the competition event user in watching the on-demand video instead of presenting entire competition event-related data in the front end page, thereby improving data display flexibility.

In the embodiments, a type of data to be obtained is first determined according to a product requirement. Optionally, the type of the obtained data may be a battle position type, a player blocking type, a current field of view type, a ward insertion/removal type, a team damage dealt type, a team damage taken type, a total property type, an economics curve type, an experience curve type, or the like. The data to be obtained may further include static data and dynamic data.

The foregoing data types are only exemplary data types of the embodiments of the present disclosure, do not mean that the data types of the embodiments of the present disclosure are only the foregoing data types, and any other type of data that can improve data display flexibility is within the scope of the present disclosure, which is not illustrated herein.

A game server extracts the data of the foregoing data types on a game client according to the product requirement, that is, extracts user behavior data, and reports all the user behavior data to a data server. After obtaining the data, the data server processes the data of the foregoing types to obtain and store a plurality of Json arrays. One type of data corresponds to one Json array. For example, the foregoing nine types of data are processed to obtain and store nine Json arrays.

When a competition event user clicks/taps different function buttons in an interface, a browser transmits, to the data server by using a front end server, a request for data of a type to be viewed by the user. The data server transmits a Json array of the data of the type to the browser according to the request.

After obtaining the data, the browser fills the data in the Json array into a page template in the page, for example, into an HTML template, renders an interface in the HTML template, and displays the interface to the competition event user.

The following describes technical implementations of a battle position, ward insertion/removal, and a current field of view in the embodiments of the present disclosure.

The Json array returned by the data server may include the following content: IDs of heroes used by two parties, a total quantity of kills (a total quantity of wards and a quantity of current effective wards), a total quantity of deaths (a total quantity of wards removed), coordinate values of where an enemy is killed (coordinate values of a ward inserted and coordinate values of a current effective ward), coordinate values of death (coordinate values of a ward removed or expired), and the like. No limitation is set herein.

Optionally, the browser fills the foregoing corresponding data into a simulated game map for display in an interaction interface. Through the interaction interface, the user may see information such as details of the heroes used by the two parties, where a hero generates a kill, where a ward is inserted, a location of a current effective ward, where a hero is killed, and where a ward of the other party is removed. No limitation is set herein.

The following describes a technical implementation of a blocking place in the embodiments of the present disclosure.

The Json array returned by the data server may include the following content: IDs of heroes used by two parties, coordinate values of where a player stops on a map, and coordinate values of the player on the game map every two seconds. The browser may employ a third-party hotspot depiction component to fill the coordinate value data of players on a game map into a virtual game map in the page for rendering. The user may see that a location where a hero stops a longer time is presented in a red state, while a location where a hero stops a short time is presented in another green state.

The following describes technical implementations of team damage dealt and team damage taken in the embodiments of the present disclosure.

The Json array returned by the data server may include the following content: IDs of heroes used by two parties and a value of damage caused (or received) by a player. In the Json data returned by the data server, the browser calculates the value of damage caused (or received) by the player in the team battle and converts the value into a bar chart for rendering in a page template and display to the user The following describes technical implementations of an economics curve and an experience curve in the embodiments of the present disclosure.

The Json array returned by the data server includes the following content: economics (experience) differences generated by two parties every five seconds. In the Json array returned by the data server, the browser draws the differences on a canvas for rendering and display to the user.

The embodiments may be, but not limited to, applied to the professional LOL competition. Different types of real-time data (including a heatmap, a battle position, team damage dealt, economics and experience curves, and an MVP score) are displayed to the user through data visualization. When watching live and on-demand videos, the user may view the real-time data of different types anytime to learn about the competition. In this way, data display flexibility is improved.

The embodiments may be applied to a live page and an on-demand page at an official website, a user may view real-time data such as a battle position, team damage dealt, a heatmap, and economics and experience curves in a competition video anytime to follow how a competition is going. In this way, competition watching experience of a competition event user is greatly improved, and user stickiness of the website is improved.

The embodiments are described by using the professional LOL competition, which does not mean that the embodiments of the present disclosure are applicable only to the professional LOL competition, but also applicable to other solutions of displaying process data during a process of playing a video of a game, which are not illustrated herein.

The drawings involved in the embodiments are used only for schematically describing the embodiments and do not constitute any limitation on the technical solutions of the present disclosure.

For ease of description, the foregoing method embodiments are represented as a series of actions, but a person skilled in the art is to appreciate that the present disclosure is not limited to the described order of the actions because some steps may be performed in another order or performed simultaneously according to the present disclosure. In addition, a person skilled in the art is also to know that all the embodiments described in this specification are exemplary embodiments, and the related actions and modules are not necessarily required in the present disclosure.

Through the foregoing description of the implementations, it is clear to a person skilled in the art that the present disclosure may be implemented by software plus a necessary universal hardware platform, and certainly may also be implemented by hardware, but in many cases, the software implementation is exemplary. Based on such an understanding, the technical solutions of the present disclosure or the part that makes contributions to the related art may be substantially embodied in the form of a software product. The computer software product is stored in a storage medium (for example, a read-only memory (ROM)/random access memory (RAM), a magnetic disk, or an optical disc), and contains several instructions for instructing a terminal device (which may be a mobile phone, a computer, a server, or a network device) to perform the method according to the embodiments of the present disclosure.

Figure 15:
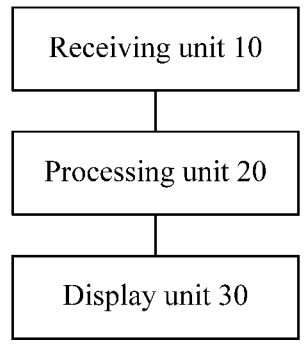
FIG. 15 is a schematic diagram of a data display apparatus according to an embodiment of the present disclosure.

According to an embodiment of the present disclosure, a data display apparatus for implementing the data display method in the embodiment shown in FIG. 2 is further provided, including one or more processors and one or more memories storing program units. The program units are executed by the processor, and the program units include a receiving unit, a processing unit, and a display unit. FIG. 15 is a schematic diagram of a data display apparatus according to an embodiment of the present disclosure. As shown in FIG. 15, the apparatus may include: a receiving unit 10, a processing unit 20, and a display unit 30.

The receiving unit 10 is configured to enable a terminal to receive a first target operation instruction on a client during a process of playing a video of a game on the client.

The processing unit 20 is configured to enable the terminal to obtain process data of a target type in response to the first target operation instruction, the process data being used for indicating information about a game process corresponding to a current moment of the video of the game.

The display unit 30 is configured to enable the terminal to display a first target interface on the client, the first target interface displaying the process data of the target type.

The receiving unit 10, the processing unit 20, and the display unit 30 may run on the terminal as a part of the apparatus, and may perform, by using a processor in the terminal, the functions implemented by the foregoing units. The terminal may be a terminal device such as a smartphone (such as an Android mobile phone or an iOS mobile phone), a tablet computer, a palmtop computer, a mobile Internet device (MID), and a PAD.

The receiving unit 10 in some embodiments may be configured to perform step S202 in the foregoing embodiment of the present disclosure, the processing unit 20 in some embodiments may be configured to perform step S204 in the foregoing embodiment of the present disclosure, and the display unit 30 in some embodiments may be configured to perform step S206 in the foregoing embodiment of the present disclosure.

In some embodiments, the receiving unit 10 enables a terminal to receive a first target operation instruction on a client during a process of playing a video of a game on the client; the processing unit 20 enables the terminal to obtain process data of a target type in response to the first target operation instruction, the process data being used for indicating information about a game process corresponding to a current moment of the video of the game; and the display unit 30 enables the terminal to display a first target interface on the client, the first target interface displaying the process data of the target type. The process data of the target type during the process of playing the video of the game is displayed to a user through data visualization, and a response can be immediately made to the target operation instruction during the process of playing the video of the game. Therefore, the user can view the process data of the target type anytime. In this way, data display flexibility when the video of the game is played is improved, thereby resolving the technical problem of low data display flexibility when a video of a game is played in the related art.

Figure 16:
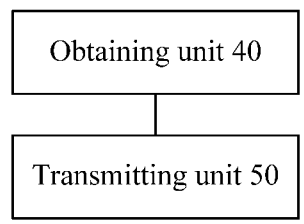
FIG. 16 is a schematic diagram of a data display apparatus according to an embodiment of the present disclosure.

According to an embodiment of the present disclosure, a data display apparatus for implementing the data display method in the embodiment shown in FIG. 3 is further provided, including one or more processors and one or more memories storing program units. The program units are executed by the processor, and the program units include an obtaining unit and a transmitting unit. FIG. 16 is a schematic diagram of a data display apparatus according to an embodiment of the present disclosure. As shown in FIG. 16, the apparatus may include: an obtaining unit 40 and a transmitting unit 50.

The obtaining unit 40 is configured to enable a server to obtain process data of a target type, the process data of the target type being displayed as instructed by a first target operation instruction received by a client, and the process data being used for indicating information about a game process corresponding to a current moment of a video of a game.

The transmitting unit 50 is configured to enable the server to transmit the process data of the target type to the client, a first target interface displaying the process data of the target type being displayed on the client.

The obtaining unit 40 and the transmitting unit 50 may be run in the server as a part of the apparatus, or a function implemented by the foregoing unit may be executed by using the processor in the server.

The obtaining unit 40 in some embodiments may be configured to perform step S302 in the foregoing embodiment of the present disclosure; and the transmitting unit 50 in some embodiments may be configured to perform step S304 in the foregoing embodiment of the present disclosure.

Examples and application scenarios in which the foregoing units are implemented are the same as those of the corresponding steps, but are not limited to the content disclosed by the foregoing embodiments. The foregoing units may run, as a part of the apparatus, in a hardware environment shown in FIG. 1, and may be implemented by using software, or may be implemented by using hardware. The hardware environment includes a network environment.

According to an embodiment of the present disclosure, an electronic device for implementing the data display method is further provided.

Figure 17:
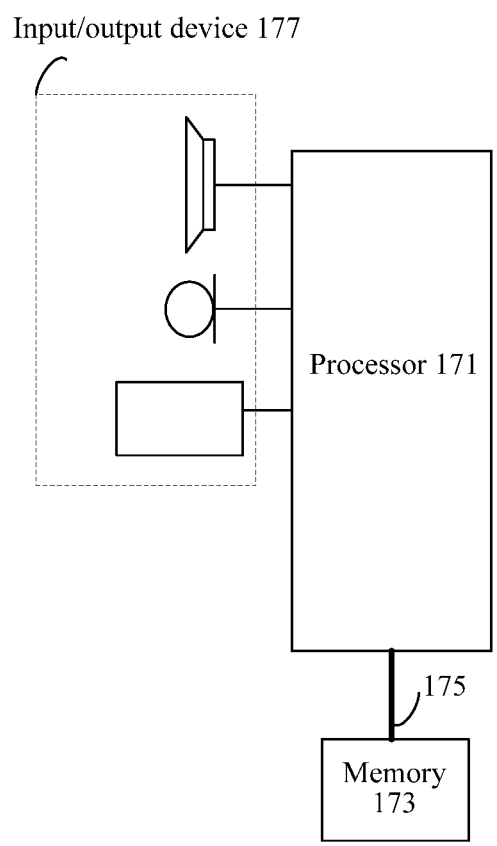
FIG. 17 is a schematic block diagram of an electronic device according to an embodiment of the present disclosure.

FIG. 17 is a schematic block diagram of an electronic device according to an embodiment of the present disclosure. As shown in FIG. 17, the electronic device may include one or more processors 171 (only one processor is shown in the figure) and a memory 173. The memory 173 may store a computer program. The processor 171 may be configured to run the computer program to perform the data display method in the embodiments of the present disclosure.

The memory 173 may be configured to store software programs and modules, for example, program instructions/modules corresponding to the data display method and apparatus in the embodiments of the present disclosure. The processor 171 is configured to run the software programs and modules stored in the memory 173, to perform various functional applications and data processing, that is, implement the data display method. The memory 173 may include a high speed RAM, and may further include a non-volatile memory, for example, one or more magnetic storage apparatuses, a flash memory, or another non-volatile solid-state memory. In some instances, the memory 173 may further include memories remotely disposed relative to the processor 171, and these remote memories may be connected to the electronic device through a network. Examples of the network include, but are not limited to, the Internet, an intranet, a local area network, a mobile communications network, and a combination thereof.

Optionally, as shown in FIG. 17, the electronic device may further include a transmission apparatus 175 and an input/output device 177. The transmission apparatus 175 is configured to receive or transmit data through a network, or may be further configured to transmit data between the processor and the memory. Specific examples of the foregoing network include a wired network and a wireless network. In an example, the transmission apparatus 175 includes a network interface controller (NIC), which may be connected to another network device and a router by using a cable, to communicate with the Internet or a local area network. In an example, the transmission apparatus 175 is a radio frequency (RF) module, which communicates with the Internet in a wireless manner.

Optionally, the memory 173 is configured to store a computer program.

The processor 171 may be configured to invoke, by using the transmission apparatus 175, the computer program stored in the memory 173, to perform the following steps:

receiving, by a terminal, a first target operation instruction on a client during a process of playing a video of a game on the client;

obtaining, by the terminal, process data of a target type in response to the first target operation instruction, the process data being used for indicating information about a game process corresponding to a current moment of the video of the game; and displaying, by the terminal, a first target interface on the client, the first target interface displaying the process data of the target type.

The processor 171 is further configured to perform the following steps: transmitting, by the terminal, a first request to a first server during the process of playing the video of the game that is currently live on the client, where the first request is used for requesting to obtain the process data of the target type from the first server; and receiving, by the client on the terminal, the process data of the target type that is transmitted by the first server in response to the first request.

The processor 171 is further configured to perform the following step: receiving, by the client on the terminal, the process data of the target type that is obtained by the first server from a target database in response to the first request.

The processor 171 is further configured to perform the following steps: before the receiving, by a terminal, a first target operation instruction on a client, displaying, by the terminal, indication information corresponding to each of a plurality of types on the client in a case that the video of the game that is currently live is present, where the indication information is associated with process data of one of the plurality of types; and receiving, by the client on the terminal, the first target operation instruction that is generated by using indication information corresponding to the target type.

The processor 171 is further configured to perform the following step: before the receiving, by a terminal, a first target operation instruction on a client, hiding, by the terminal, indication information corresponding to each of a plurality of types on the client in a case that the video of the game that is currently live is absent, where the indication information is associated with process data of one of the plurality of types.

The processor 171 is further configured to perform the following steps: before the receiving, by a terminal, a first target operation instruction on a client, transmitting, by the terminal, a page parameter of a target page to a first server during the process of playing the video of the game that is on-demand on the client, where the page parameter of the target page is used for instructing to obtain process data of a current game round in the game; and receiving, by the client on the terminal, the process data of the current game round transmitted by the first server; and obtaining, by the terminal, a play progress of the video of the game at the current moment; and selecting, by the terminal, process data of the target type corresponding to a target range of the play progress from the process data of the current game round.

The processor 171 is further configured to perform the following step: receiving, by the client on the terminal, the process data of the current game round obtained by the first server from a target database.

The processor 171 is further configured to perform the following step: before the receiving, by a terminal, a first target operation instruction on a client, presenting, by the client on the terminal, information of the target type on a play progress bar of the video of the game during the process of playing the video of the game that is on-demand on the client, where a location at which the information of the target type is presented on the play progress bar is used for indicating a time corresponding to the process data of the target type during the process of playing the video of the game that is on-demand on the client.

The processor 171 is further configured to perform the following steps: adding, by the client on the terminal, the process data of the target type to a target template, where the target template is used for rendering the process data of the target type; and displaying, by the terminal, the first target interface that is obtained by rendering the process data of the target type by using the target template.

The processor 171 is further configured to perform the following steps: after the displaying, by the terminal, a first target interface on the client, receiving, by the terminal, a second target operation instruction in the first target interface, where the second target operation instruction is used for instructing to display subprocess data of the process data of the target type; obtaining, by the terminal, the subprocess data of the process data of the target type in response to the second target operation instruction; and displaying, by the terminal, a second target interface on the client, where the second target interface displays the subprocess data of the process data of the target type.

Optionally, the processor 171 may further invoke, by using the transmission apparatus 175, the computer program stored in the memory 173, to perform the following steps:

obtaining, by a server, process data of a target type, the process data of the target type being displayed as instructed by a first target operation instruction received by a client, and the process data being used for indicating information about a game process corresponding to a current moment of a video of a game; and transmitting, by the server, the process data of the target type to the client, a first target interface displaying the process data of the target type being displayed on the client.

According to some embodiments of the present disclosure, a data display solution is provided. A terminal receives a first target operation instruction on a client during a process of playing a video of a game on the client; the terminal obtains process data of a target type in response to the first target operation instruction, the process data being used for indicating information about a game process corresponding to a current moment of the video of the game; and the terminal displays a first target interface on the client, the first target interface displaying the process data of the target type. The process data of the target type during the process of playing the video of the game is displayed to a user through data visualization, and a response can be immediately made to the target operation instruction during the process of playing the video of the game. Therefore, the user can view the process data of the target type anytime. In this way, data display flexibility when the video of the game is played is improved, thereby resolving the technical problem of low data display flexibility when a video of a game is played in the related art.

Optionally, for a specific example in some embodiments, reference may be made to the examples described in the foregoing embodiments, and details are not described again.

A person of ordinary skill in the art may understand that, the structure shown in FIG. 17 is only illustrative. The electronic device may be an electronic device such as a smartphone (such as an Android mobile phone or an iOS mobile phone), a tablet computer, a palmtop computer, a MID, or a PAD. FIG. 17 does not constitute a limitation on a structure of the electronic device. For example, the electronic device may alternatively include more or less components (such as a network interface and a display apparatus) than those shown in FIG. 17, or has a configuration different from that shown in FIG. 17.

A person of ordinary skill in the art may understand that all or part of the steps of the methods in the embodiments may be implemented by a program by instructing hardware relevant to an electronic device. The program may be stored in a computer readable storage medium, and the storage medium may be a flash drive, a ROM, a RAM, a magnetic disk, an optical disk, and so on.

An embodiment of the present disclosure further provides a storage medium. Optionally, in some embodiments, the storage medium stores a computer program, the computer program being configured to perform the data display method when being run.

Optionally, in some embodiments, the storage medium may be located on at least one of a plurality of network devices on the network shown in the foregoing embodiment.

Optionally, in some embodiments, the storage medium is configured to store program code for performing the following steps:

receiving, by a terminal, a first target operation instruction on a client during a process of playing a video of a game on the client;

obtaining, by the terminal, process data of a target type in response to the first target operation instruction, the process data being used for indicating information about a game process corresponding to a current moment of the video of the game; and displaying, by the terminal, a first target interface on the client, the first target interface displaying the process data of the target type.

Optionally, the storage medium is further configured to store program code for performing the following steps: transmitting, by the terminal, a first request to a first server during the process of playing the video of the game that is currently live on the client, where the first request is used for requesting to obtain the process data of the target type from the first server; and receiving, by the client on the terminal, the process data of the target type that is transmitted by the first server in response to the first request.

The storage medium is further configured to store program code for performing the following step: receiving, by the client on the terminal, the process data of the target type that is obtained by the first server from a target database in response to the first request.

The storage medium is further configured to store program code for performing the following steps: before the receiving, by a terminal, a first target operation instruction on a client, displaying, by the terminal, indication information corresponding to each of a plurality of types on the client in a case that the video of the game that is currently live is present, where the indication information is associated with process data of one of the plurality of types; and receiving, by the client on the terminal, the first target operation instruction that is generated by using indication information corresponding to the target type.

The storage medium is further configured to store program code for performing the following step: before the receiving, by a terminal, a first target operation instruction on a client, hiding, by the terminal, indication information corresponding to each of a plurality of types on the client in a case that the video of the game that is currently live is absent, where the indication information is associated with process data of one of the plurality of types.

The storage medium is further configured to store program code for performing the following steps: before the receiving, by a terminal, a first target operation instruction on a client, transmitting, by the terminal, a page parameter of a target page to a first server during the process of playing the video of the game that is on-demand on the client, where the page parameter of the target page is used for instructing to obtain process data of a current game round in the game; and receiving, by the client on the terminal, the process data of the current game round transmitted by the first server; and obtaining, by the terminal, a play progress of the video of the game at the current moment; and selecting, by the terminal, process data of the target type corresponding to a target range of the play progress from the process data of the current game round.

The storage medium is further configured to store program code for performing the following step: receiving, by the client on the terminal, the process data of the current game round obtained by the first server from a target database.

The storage medium is further configured to store program code for performing the following step: before the receiving, by a terminal, a first target operation instruction on a client, presenting, by the client on the terminal, information of the target type on a play progress bar of the video of the game during the process of playing the video of the game that is on-demand on the client, where a location at which the information of the target type is presented on the play progress bar is used for indicating a time corresponding to the process data of the target type during the process of playing the video of the game that is on-demand on the client.

The storage medium is further configured to store program code for performing the following steps: adding, by the client on the terminal, the process data of the target type to a target template, where the target template is used for rendering the process data of the target type; and displaying, by the terminal, the first target interface that is obtained by rendering the process data of the target type by using the target template.

The storage medium is further configured to store program code for performing the following steps: after the displaying, by the terminal, a first target interface on the client, receiving, by the terminal, a second target operation instruction in the first target interface, where the second target operation instruction is used for instructing to display subprocess data of the process data of the target type; obtaining, by the terminal, the subprocess data of the process data of the target type in response to the second target operation instruction; and displaying, by the terminal, a second target interface on the client, where the second target interface displays the subprocess data of the process data of the target type.

Optionally, in some embodiments, the storage medium is further configured to store program code for performing the following steps:

obtaining, by a server, process data of a target type, the process data of the target type being displayed as instructed by a first target operation instruction received by a client, and the process data being used for indicating information about a game process corresponding to a current moment of a video of a game; and transmitting, by the server, the process data of the target type to the client, a first target interface displaying the process data of the target type being displayed on the client.

Optionally, for a specific example in some embodiments, reference may be made to the examples described in the foregoing embodiments, and details are not described again.

Optionally, in some embodiments, the foregoing storage medium includes, but is not limited to: any medium that can store program code, such as a USB flash drive, a ROM, a RAM, a removable hard disk, a magnetic disk, or an optical disc.

The data display method and apparatus, the storage medium, and the electronic device according to the embodiments of the present disclosure are described above by using examples with reference to the accompanying drawings. However, a person skilled in the art is to understand that, various improvements may be further made to the data display method and apparatus, the storage medium, and the electronic device proposed in the embodiments of the present disclosure without departing from content of the present disclosure. Therefore, the protection scope of the embodiments of the present disclosure is subject to the content of the appended claims.

The sequence numbers of the embodiments of the present disclosure are merely for the convenience of description, and do not imply the preference among the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of the present disclosure essentially, or the part contributing to the related art, or all or some of the technical solutions may be represented in a form of a software product. The computer software product is stored in a storage medium and includes several instructions for instructing one or more computer devices (which may be a personal computer, a server, or a network device) to perform all or some of the steps of the methods in the embodiments of the present disclosure.

In the foregoing embodiments of the present disclosure, the description of each embodiment has respective focuses, and for the part that is not detailed in an embodiment, reference may be made to the relevant description of other embodiments.

In the several embodiments provided in the present disclosure, it is to be understood that the disclosed client may be implemented in another manner. For example, the described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

The foregoing descriptions are merely exemplary implementations of the present disclosure. A person of ordinary skill in the art may make several improvements or modifications without departing from the principle of the present disclosure, and the improvements or modifications shall fall within the protection scope of the present disclosure.

INDUSTRIAL APPLICABILITY

In the embodiments of the present disclosure, a terminal receives a first target operation instruction on a client during a process of playing a video of a game on the client; the terminal obtains process data of a target type in response to the first target operation instruction, the process data being used for indicating information about a game process corresponding to a current moment of the video of the game; and the terminal displays a first target interface on the client, the first target interface displaying the process data of the target type. The process data of the target type during the process of playing the video of the game is displayed to a user through data visualization, and a response can be immediately made to the target operation instruction during the process of playing the video of the game. Therefore, the user can view the process data of the target type anytime. In this way, data visualization is achieved, and data display flexibility when the video of the game is played is improved, thereby resolving the technical problem of low data display flexibility when a video of a game is played in the related art.

What is claimed is:

1. A data display method, implemented by a terminal, comprising:
   receiving a first target operation instruction on a client during a process of playing a video of a game event on the client;
   obtaining process data of a target type in response to the first target operation instruction, the process data indicating game information corresponding to a current moment of the video of the game event, the current moment indicating a current watching progress of the video of the game event played on the client, and the game information being time-sensitive; and
   displaying a first target interface on the client, the first target interface displaying the process data of the target type,
   wherein the first target interface includes a virtual game map, and the process data of the target type displaying on the virtual game map includes activity locations of a game character corresponding to the current moment; and
   displaying the first target interface comprises: in response to detecting that a team damage dealt function being triggered on the first target interface,
      transmitting a request for obtaining the process data of a team damage dealt type;
      receiving and processing the process data of the team damage dealt type to obtain a team damage dealt interaction interface, the team damage dealt interaction interface displaying damages caused or received by players in a team battle round closest to the current moment;
      displaying options of a plurality of team battle rounds within the game event on the team damage dealt interaction interface, each team battle round being a game period with a start moment and an ending moment, and a displayed text of each option of team battle round includes a start moment and an ending moment of the team battle round corresponding to the option; and
      in response to one of the options being selected, displaying damages caused or received by players in a team battle round corresponding to the selected option.

2. The method according to claim 1, wherein the video of the game event is a live streaming video and obtaining, by the terminal, the process data of the target type comprises:
   transmitting, by the terminal, a first request to a first server according to the first target operation instruction, wherein the first request is used for requesting the process data of the target type from the first server; and
   receiving, by the client on the terminal, the process data of the target type transmitted by the first server in response to the first request.

3. The method according to claim 2, wherein:
   the process data of the target type received by the client is obtained by the first server from a target database in response to the first request.

4. The method according to claim 1, wherein the video of the game event is a live streaming video;
   before receiving the first target operation instruction on the client, the method further comprises: displaying, by the terminal, indication information corresponding to each of a plurality of types on the client, wherein the indication information is associated with process data of one of the plurality of types; and
   the first target operation instruction is generated by using indication information corresponding to the target type.

5. The method according to claim 1, wherein before receiving the first target operation instruction, the method further comprises:
   hiding, by the terminal, indication information corresponding to each of a plurality of types on the client in response to the video of the game event that being not currently live, wherein the indication information is associated with process data of one of the plurality of types.

6. The method according to claim 1, wherein the video of the game event is an on-demand video;
   before receiving the first target operation instruction, the method further comprises: transmitting, by the terminal, a page parameter of a target page to a first server during the process of playing the video of the game event, wherein the page parameter of the target page is used for obtaining process data of a current game round in the game; and receiving, by the client on the terminal, the process data of the current game round transmitted by the first server; and
   obtaining, by the terminal, the process data of the target type comprises: obtaining, by the terminal, a play progress of the video of the game event at the current moment; and selecting, by the terminal, the process data of the target type corresponding to a target range of the play progress from the process data of the current game round.

7. The method according to claim 6, wherein:
   the process data of the current game round received by the client is obtained by the first server from a target database.

8. The method according to claim 1, wherein the video of the game event is an on-demand video; and before receiving the first target operation instruction, the method further comprises:

presenting, by the client on the terminal, game information of the target type on a play progress bar of the video of the game event, wherein a location at which the information of the target type is presented on the play progress bar indicates a time corresponding to the process data of the target type.

9. The method according to claim 1, wherein displaying the first target interface on the client comprises:

adding, by the client on the terminal, the process data of the target type to a target template, wherein the target template is used for rendering the process data of the target type; and displaying, by the terminal, the first target interface that is obtained by rendering the process data of the target type by using the target template.

10. The method according to claim 1, wherein after displaying the first target interface on the client, the method further comprises:

receiving, by the terminal, a second target operation instruction in the first target interface, wherein the second target operation instruction is used for instructing to display subprocess data of the process data of the target type;

obtaining, by the terminal, the subprocess data of the process data of the target type in response to the second target operation instruction; and displaying, by the terminal, a second target interface on the client, wherein the second target interface displays the subprocess data of the process data of the target type.

11. The method according to claim 1, wherein displaying the first target interface comprises:

in response to detecting that a hotspot function being triggered on the first target interface, displaying a hotspot visualization map including a plurality of hotspots, a color state of each hotspot indicating a time length that the game character has stopped at a corresponding location until the current moment of the video of the game event.

12. The method according to claim 1, wherein the battle position information of gaming parties displayed on the interactive kill/death map is adjusted according to the current watching progress of the video game event played on the client.

13. The method according to claim 1, wherein displaying the first target interface further comprises: in response to detecting that an economics curve function being triggered on the first target interface, extracting, from entire game event data according to the current moment of the video of the game event, data of an economics curve type closest to the current moment;

converting the data into a team economics comparison map interaction interface, and displaying the team economics comparison map interaction interface corresponding to the current moment of the video game event played on the client.

14. The method according to claim 13, wherein displaying the economics comparison map interaction interface comprises:

drawing differences of game economics or experience generated by game teams at preset intervals according to current watching progress of the client.

15. The method according to claim 1, wherein displaying the first target interface comprises: in response to detecting that a battle position function being triggered on the first target interface, extracting, from entire game event data according to the current moment of the video of the game event, process data of a battle position type corresponding to a kill/death event closest to the current moment;

converting the process data of the battle position type into battle position information of gaming parties corresponding to the current moment on an interactive kill/death map; and displaying the interactive kill/death map corresponding to the current moment on the first target interface.

16. The method according to claim 1, wherein the options of the plurality of team battle rounds are displayed in a same menu, and the displayed text of the currently selected option is highlighted among the options in the menu.

17. An electronic device, comprising a memory and a processor, the memory storing a computer program, and the processor being configured to execute the computer program to perform:

receiving a first target operation instruction on a client during a process of playing a video of a game event on the client;

obtaining process data of a target type in response to the first target operation instruction, the process data being used for indicating game information corresponding to a current moment of the video of the game event, the current moment indicating a current watching progress of the video of the game event played on the client, and the game information being time-sensitive; and displaying a first target interface on the client, the first target interface displaying the process data of the target type, wherein the first target interface includes a virtual game map, and the process data of the target type displaying on the virtual game map includes activity locations of a game character corresponding to the current moment; and displaying the first target interface comprises: in response to detecting that—a team damage dealt function being triggered on the first target interface, transmitting a request for obtaining the process data of a team damage dealt type;

receiving and processing the process data of the team damage dealt type to obtain a team damage dealt interaction interface, the team damage dealt interaction interface displaying damages caused or received by players in a team battle round closest to the current moment;

displaying options of a plurality of team battle rounds within the game event on the team damage dealt interaction interface, each team battle round being a game period with a start moment and an ending moment, and a displayed text of each option of team battle round includes a start moment and an ending moment of the team battle round corresponding to the option; and in response to one of the options being selected, displaying damages caused or received by players in a team battle round corresponding to the selected option.

18. The device according to claim 17, wherein the video of the game event is a live streaming video and obtaining the process data of the target type comprises:

transmitting a first request to a first server according to the first target operation instruction, wherein the first request is used for requesting the process data of the target type from the first server; and receiving, by the client, the process data of the target type transmitted by the first server in response to the first request.

19. The device according to claim 18, wherein:
the process data of the target type received by the client is obtained by the first server from a target database in response to the first request.

20. A non-transitory storage medium, storing a computer program, the computer program being configured to perform:

receiving a first target operation instruction on a client during a process of playing a video of a game event on the client;

obtaining process data of a target type in response to the first target operation instruction, the process data being used for indicating game information corresponding to a current moment of the video of the game event, the current moment indicating a current watching progress of the video game event played on the client, and the game information being time-sensitive; and displaying a first target interface on the client, the first target interface displaying the process data of the target type, wherein the first target interface includes a virtual game map, and the process data of the target type displaying on the virtual game map includes activity locations of a game character corresponding to the current moment; and displaying the first target interface comprises: in response to detecting that—a team damage dealt function being triggered on the first target interface, transmitting a request for obtaining the process data of a team damage dealt type;

receiving and processing the process data of the team damage dealt type to obtain a team damage dealt interaction interface, the team damage dealt interaction interface displaying damages caused or received by players in a team battle round closest to the current moment;

displaying options of a plurality of team battle rounds within the game event on the team damage dealt interaction interface, each team battle round being a game period with a start moment and an ending moment, and a displayed text of each option of team battle round includes a start moment and an ending moment of the team battle round corresponding to the option; and in response to one of the options being selected, displaying damages caused or received by players in a team battle round corresponding to the selected option.

* * * * *